(12) United States Patent
Khorashadi et al.

(10) Patent No.: US 9,389,085 B2
(45) Date of Patent: Jul. 12, 2016

(54) MAP HANDLING FOR LOCATION BASED SERVICES IN CONJUNCTION WITH LOCALIZED ENVIRONMENTS

(75) Inventors: Behrooz Khorashadi, San Jose, CA (US); Saumitra Mohan Das, San Jose, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 13/010,577

(22) Filed: Jan. 20, 2011

(65) Prior Publication Data

US 2012/0029817 A1 Feb. 2, 2012

Related U.S. Application Data

(60) Provisional application No. 61/297,524, filed on Jan. 22, 2010.

(51) Int. Cl.
*G01C 21/20* (2006.01)
*G09B 29/10* (2006.01)

(52) U.S. Cl.
CPC .............. *G01C 21/20* (2013.01); *G01C 21/206* (2013.01); *G09B 29/106* (2013.01)

(58) Field of Classification Search
CPC ..... G01C 21/005; G01C 21/20; G01C 21/206
See application file for complete search history.

(56) References Cited

U.S. PATENT DOCUMENTS 6,009,359 A * 12/1999 El-Hakim et al. .............. 701/28
6,047,234 A * 4/2000 Cherveny et al. ............ 701/451

(Continued)

FOREIGN PATENT DOCUMENTS

CN 1351741 A 5/2002
CN 1530635 A 9/2004

(Continued)

OTHER PUBLICATIONS

Kyoung-Wook Min et al., "The Mobile Spatial DBMS for the Partial Map Air Update in the Navigation", Proceedings of the 11th International IEEE Conference on Intelligent Transportation Systems, Oct. 12-15, 2008, pp. 476-481.

(Continued)

*Primary Examiner* — Helal A Algahaim
*Assistant Examiner* — Donald J Wallace
(74) *Attorney, Agent, or Firm* — Thomas A. Jolly

(57) ABSTRACT

The subject matter disclosed herein relates to systems, methods, apparatuses, devices, articles, and means for map handling for location based services in conjunction with localized environments. For certain example implementations, a method may comprise storing map information corresponding to a particular localized environment that is associated with a particular location context identifier, with the particular localized environment comprising an indoor environment corresponding to at least a portion of a building structure; receiving update information applicable to the map information corresponding to the particular localized environment, with the update information being associated with the particular location context identifier; updating the map information corresponding to the particular localized environment based at least partly on the update information so as to produce updated map information; and providing the updated map information to one or more mobile devices that are located at the particular localized environment. Other example implementations are described herein.

60 Claims, 14 Drawing Sheets

(56) References Cited

U.S. PATENT DOCUMENTS

| | | |
|---|---|---|
| 6,259,405 B1 | 7/2001 | Stewart et al. |
| 6,262,738 B1 | 7/2001 | Gibson et al. |
| 6,295,502 B1 | 9/2001 | Hancock et al. |
| 6,366,242 B1 | 4/2002 | Boyd et al. |
| 6,490,460 B1 | 12/2002 | Soliman |
| 6,510,244 B2 | 1/2003 | Proesmans et al. |
| 6,529,164 B1 | 3/2003 | Carter |
| 6,597,359 B1 | 7/2003 | Lathrop |
| 6,859,727 B2 | 2/2005 | Bye et al. |
| 6,917,893 B2* | 7/2005 | Dietsch et al. ............... 702/150 |
| 7,035,650 B1 | 4/2006 | Moskowitz et al. |
| 7,379,958 B2 | 5/2008 | Karhu |
| 7,466,986 B2* | 12/2008 | Halcrow et al. ............... 701/408 |
| 7,480,513 B2 | 1/2009 | Woo |
| 7,616,156 B2 | 11/2009 | Smith et al. |
| 7,647,055 B2 | 1/2010 | Gum et al. |
| 7,761,233 B2 | 7/2010 | Schott et al. |
| 7,840,227 B2 | 11/2010 | Kahlert et al. |
| 7,899,006 B2 | 3/2011 | Boyd |
| 7,912,633 B1* | 3/2011 | Dietsch et al. ............... 701/450 |
| 8,040,219 B2 | 10/2011 | Haartsen et al. |
| 8,064,954 B1 | 11/2011 | Fujisaki |
| 8,068,056 B2 | 11/2011 | Wachter et al. |
| 8,102,314 B2 | 1/2012 | Bamberger et al. |
| 8,150,397 B2 | 4/2012 | Khetawat et al. |
| 8,234,234 B2 | 7/2012 | Shearer |
| 8,265,658 B2 | 9/2012 | Issa et al. |
| 8,340,901 B2 | 12/2012 | Fahn et al. |
| 8,344,949 B2 | 1/2013 | Moshfeghi |
| 8,350,758 B1 | 1/2013 | Parvizi et al. |
| 8,374,187 B2 | 2/2013 | Morand et al. |
| 8,818,401 B2 | 8/2014 | Gupta et al. |
| 2001/0037305 A1 | 11/2001 | Mochizuki |
| 2002/0059025 A1 | 5/2002 | Kim et al. |
| 2003/0008661 A1 | 1/2003 | Joyce et al. |
| 2004/0015325 A1 | 1/2004 | Hirano et al. |
| 2004/0061646 A1 | 4/2004 | Andrews et al. |
| 2004/0117753 A1 | 6/2004 | Kahng et al. |
| 2004/0139049 A1* | 7/2004 | Hancock et al. ............... 707/1 |
| 2004/0181335 A1 | 9/2004 | Kim et al. |
| 2004/0193365 A1 | 9/2004 | Kokojima et al. |
| 2004/0193707 A1 | 9/2004 | Alam et al. |
| 2005/0280647 A1 | 12/2005 | Wang et al. |
| 2006/0149465 A1 | 7/2006 | Park et al. |
| 2006/0217881 A1* | 9/2006 | Pei et al. ............... 701/208 |
| 2006/0221918 A1 | 10/2006 | Wang |
| 2006/0245406 A1 | 11/2006 | Shim |
| 2006/0287813 A1 | 12/2006 | Quigley |
| 2007/0001904 A1 | 1/2007 | Mendelson |
| 2007/0052724 A1 | 3/2007 | Graham et al. |
| 2007/0143016 A1 | 6/2007 | Kung et al. |
| 2007/0184845 A1 | 8/2007 | Troncoso |
| 2007/0219711 A1 | 9/2007 | Kaldewey et al. |
| 2007/0293239 A1 | 12/2007 | Dawson et al. |
| 2008/0082225 A1* | 4/2008 | Barrett ............... 701/26 |
| 2008/0102857 A1 | 5/2008 | Kim |
| 2008/0183483 A1 | 7/2008 | Hart |
| 2008/0227463 A1 | 9/2008 | Hizume et al. |
| 2008/0280624 A1 | 11/2008 | Wrappe |
| 2009/0019095 A1 | 1/2009 | Asahara et al. |
| 2009/0043502 A1 | 2/2009 | Shaffer et al. |
| 2009/0043504 A1 | 2/2009 | Bandyopadhyay et al. |
| 2009/0102707 A1 | 4/2009 | Elwell, Jr. et al. |
| 2009/0119010 A1 | 5/2009 | Moravec |
| 2009/0157294 A1 | 6/2009 | Geelen et al. |
| 2009/0163228 A1 | 6/2009 | Blumberg et al. |
| 2009/0216438 A1 | 8/2009 | Shafer |
| 2009/0238417 A1 | 9/2009 | Nielsen et al. |
| 2009/0251366 A1 | 10/2009 | McClure et al. |
| 2010/0008337 A1 | 1/2010 | Bajko |
| 2010/0023249 A1 | 1/2010 | Mays et al. |
| 2010/0023250 A1 | 1/2010 | Mays et al. |
| 2010/0023252 A1 | 1/2010 | Mays et al. |
| 2010/0125409 A1 | 5/2010 | Prehofer |
| 2010/0144367 A1 | 6/2010 | Goh et al. |
| 2010/0259450 A1 | 10/2010 | Kainulainen et al. |
| 2010/0299065 A1 | 11/2010 | Mays |
| 2010/0305851 A1* | 12/2010 | Meyer et al. ............... 701/208 |
| 2010/0331016 A1 | 12/2010 | Dutton et al. |
| 2011/0015860 A1 | 1/2011 | Nesbitt |
| 2011/0080848 A1 | 4/2011 | Khorashadi et al. |
| 2011/0081918 A1 | 4/2011 | Burdo et al. |
| 2011/0081919 A1 | 4/2011 | Das et al. |
| 2011/0082638 A1 | 4/2011 | Khorashadi et al. |
| 2011/0086646 A1 | 4/2011 | Gupta et al. |
| 2011/0172916 A1 | 7/2011 | Pakzad et al. |
| 2011/0178705 A1 | 7/2011 | Pakzad et al. |
| 2012/0007779 A1 | 1/2012 | Klepal et al. |
| 2012/0044265 A1 | 2/2012 | Khorashadi et al. |
| 2012/0101727 A1 | 4/2012 | Mays et al. |
| 2012/0130632 A1 | 5/2012 | Bandyopadhyay et al. |
| 2012/0203453 A1 | 8/2012 | Lundquist et al. |
| 2013/0316742 A1 | 11/2013 | Gupta et al. |
| 2013/0317778 A1 | 11/2013 | Gupta et al. |
| 2013/0345967 A1 | 12/2013 | Pakzad |
| 2014/0066103 A1 | 3/2014 | Das et al. |
| 2014/0095007 A1 | 4/2014 | Angle et al. |
| 2015/0138019 A1 | 5/2015 | Gupta et al. |
| 2015/0230051 A1 | 8/2015 | Das et al. |

FOREIGN PATENT DOCUMENTS

| | | |
|---|---|---|
| CN | 1707223 A | 12/2005 |
| CN | 101147407 A | 3/2008 |
| CN | 101151508 A | 3/2008 |
| CN | 101275854 A | 10/2008 |
| CN | 101427105 A | 5/2009 |
| CN | 101487714 A | 7/2009 |
| CN | 101576384 A | 11/2009 |
| DE | 102007045082 A1 | 4/2009 |
| EA | 009927 B1 | 4/2008 |
| EP | 0921509 A2 | 6/1999 |
| EP | 1708152 A2 | 10/2006 |
| EP | 2148167 A2 | 1/2010 |
| GB | 2355793 A | 5/2001 |
| JP | H11249552 A | 9/1999 |
| JP | 2000111648 A | 4/2000 |
| JP | 2001285337 A | 10/2001 |
| JP | 2002221422 A | 8/2002 |
| JP | 2003240591 A | 8/2003 |
| JP | 2004150827 A | 5/2004 |
| JP | 2006130131 A | 5/2006 |
| JP | 2006253888 A | 9/2006 |
| JP | 2006267057 A | 10/2006 |
| JP | 2006267114 A | 10/2006 |
| JP | 2007333998 A | 12/2007 |
| JP | 2008083112 A | 4/2008 |
| JP | 2008219394 A | 9/2008 |
| JP | 2009123105 A | 6/2009 |
| JP | 2010539547 A | 12/2010 |
| KR | 20060078162 A | 7/2006 |
| KR | 20070056673 A | 6/2007 |
| KR | 20080092781 A | 10/2008 |
| KR | 20090096982 A | 9/2009 |
| RU | 2358282 C2 | 6/2009 |
| TW | I230909 B | 4/2005 |
| TW | I240085 B | 9/2005 |
| TW | 200821550 A | 5/2008 |
| WO | WO-2005027553 A1 | 3/2005 |
| WO | WO-2005106503 A1 | 11/2005 |
| WO | WO-2007025143 A1 | 3/2007 |
| WO | WO-2007056738 A2 | 5/2007 |
| WO | WO-2009040063 A1 | 4/2009 |
| WO | 2009056150 A1 | 5/2009 |

OTHER PUBLICATIONS

Beal J.R. Jr., et al., "Contextual Geolocation: A Specialized Application for Improving Indoor Location Awareness in Wireless Local Area Networks," College of Graduate Studies and Research, Minnesota State University, Mankato, MN, 2003, 17 pages.

Ceranka S. et al., "Application of particle filtering in navigation system for blind", ISSPA 2003, Seventh International Symposium on

(56) References Cited

OTHER PUBLICATIONS

Signal Processing and Its Applications, Proceedings (CAT.NO. 03EX714), vol. 2, 2003, pp. 495-498, XP002632287.
Chaer W.S., et al., "A mixture-of-experts framework for adaptive Kalman filtering", IEEE Transactions on Systems, Man and Cybernetics, Part B (Cybernetics), vol. 27, No. 3, Jun. 1997 (1997-06), pp. 452-464, XP002632376, IEEE USA ISSN: 1083-4419, DOI: 10.1109/3477.584952.
Chittaro L., et al., "Presenting Evacuation Instructions on Mobile Devices by means of Location-Aware 3D Virtual Environments", MobileHCI 2008, Sep. 2-5, 2008, Amsterdam, The Netherlands, pp. 395-398.
Evennou F., et al., "Map-aided indoor mobile positioning system using particlefilter ", IEEE Wireless Communications and Networking Conference (IEEE Cat.No.05TH8794), vol. 4, May 2, 2005, pp. 2490-2494, XP002632286, IEEE Piscataway, NJ, USA.
International Search Report and Written Opinion—PCT/US2011/022118, ISA/EPO—May 6, 2011.
Kandepu R., et al., "Constrained state estimation using the Unscented Kalman Filter", Control and Automation, 2008 16th Mediterranean Conference on, IEEE, Piscataway, NJ, USA, Jun. 25, 2008, pp. 1453-1458, XP031308449, ISBN: 978-1-4244-2504-4.
Li X., et al., "A Continuous-based Model for the Analysis of Indoor Spaces", Spatial and Temporal Reasoning for Ambient Intelligence Systems, COSIT 2009 Workshop Proceedings, Aug. 2009, Edited by Mehul Bhatt and Hans Guesgen, pp. 44-53.
Li X., et al., "Assisting video surveillance in micro-spatial environments with a GIS approach", Geoinformatics 2007 Geospatial Information Technology and Applications, SPIE vol. 6754 (2007), pp. 675402-1 to 675402-8.
Lorenz B., et al., "A Hybrid Spatial Model for Representing Indoor Environments", W2GIS 2006, LNCS 4295 pp. 102-112.
Lyardet F., et al., "CoINS: Context Sensitive Indoor Navigation System", Multimedia, 2006. ISM'06. Eighth IEEE International Symposium on, IEEE, PI, Dec. 1, 2006 (2006-12-01), pp. 209-218, XP031041784, ISBN: 978-0-7695-2746-8 p. 1, right-hand column p. 2, right-hand column-p. 6, left-hand column.
Martire, et al., "Location based service architecture for simple mobile services", Information Society Technologies, Version 1.1, Aug. 2008.
Meneses F., et al., "Enhancing the Location-Context Through Inference Over Positioning Data", Department of Information Systems, University of Minho, Portugal, 2006, pp. 40-49.
Nomoto K., et al., "An adaptive tracking filter controlling sampling frequency phased array radar", ICASSP 86 Proceedings. IEEE-IECEJ-ASJ International Conference on Acoustics, Speech and Signal Processing (CAT.NO.86CH2243-4), 1986, pp. 2571-2574, XP002632375, IEEE New York, NY, USA.
OMA (Open Mobile Alliance Ltd.), "Secure User Plan Location Architecture", Draft Version 3.0—Feb. 10, 2010, pp. 1-41.
Orville R.E., "Development of the National Lightning Detection Network," BAMS, Feb. 2008, 11 pages.
Paul A.S., et al., "Wi-Fi based indoor localization and tracking using sigma-point Kalman filtering methods", Position, Location and Navigation Symposium, 2008 IEEE/ Ion, IEEE, Piscataway, NJ, USA, May 5, 2008, pp. 646-659, XP031288927, ISBN: 978-1-4244-1536-6.
Sherwani, Lecture notes: "Global Routing", Algorithms for VLSI Physical Design Automation, 1992, pp. 6.1-6.40.
Soltani A. R., et al., "A fuzzy based multi-objective path planning of construction sites", Automation in Construction, Elsevier Science Publishers, Amsterdam, NL, vol. 13, No. 6, Nov. 1, 2004, pp. 717-734, XP004543997, ISSN: 0926-5805, DOI: DOI:10.1016/J.Autcon.2004.04.012 p. 719, left-hand column, paragraph 2 p. 720-p. 721 p. 723, right-hand column p. 725, right-hand column-p. 727 figures 1-3,5,7,10,14.
Whiting E.J., "Geometric, Topological & Semantic Analysis of Multi-Building Floor Plan Data", Jun. 2006, Thesis for Master of Science in Architecture Studies at Massachusetts Institute of Technology, pp. 1-74.
Yanco H.A., "Wheelesley: A Robotic Wheelchair System: Indoor Navigation and User Interface", Assistive Technology and AI, LNAO 1458, V.O. Mittal et al (Eds), 1998, pp. 256-268.
Zha H., et al., "Detecting changes in a dynamic environment for updating its maps by using a mobile robot", Intelligent Robots and Systems, 1997, IROS 97, Proceedings of the 1997 IEEE/RSJ International Conference on Grenoble, France Sep. 7-11, 1997, New York, NY, USA, IEEE, US, vol. 3, Sep. 7, 1997, pp. 1729-1734, XP010264873, DOI: 10.1109/IROS.1997.656593, ISBN: 978-0-7803-4119-7.
Xiaoqin et al., "The Control of Navigation Along a Wall for a Mobile Robot Based on Infrared PSD," (Wall-following Navigation Control for Infra PSD-based Mobile Robot) Machine Tool & Hydraulics, Sep. 30, 2009, vol. 37, No. 9, pp. 133-136.
Taiwan Search Report—TW100102372—TIPO—Oct. 14, 2013.
Butz A., et al., "A Hybrid Indoor Navigation System," International Conference on Intelligent User Interfaces, 2001, pp. 1-8.
Li X., et al., "A continuous-based model for the analysis of indoor spaces", Conference on Spatial Information Theory (COSIT 2009), Sep. 21, 2009, XP002690502, [retrieved on Jan. 11, 2013].
Nizetic, I., et al., "A prototype for the short-term prediction of moving object's movement using markov chains", proceedings of the ITI, Jun. 25, 2009, XP002690504, pp. 559-564, [retrieved on Jan. 16, 2013].
Widyawan et al: "A novel backtracking particle filter for pattern matching indoor localization", Proceedings of the First ACM International Workshop on Mobile Entity Localization and Tracking in GPS-Less Environments, Melt '08, Jan. 1, 2008, p. 79, XP055038756, New York, USA DOI: 10.1145/1410012.1410031, ISBN: 978-1-60-558189-7.

* cited by examiner

MAP HANDLING FOR LOCATION BASED SERVICES IN CONJUNCTION WITH LOCALIZED ENVIRONMENTS

CLAIM OF PRIORITY UNDER 35 U.S.C. §119

This application claims priority under 35 USC 119 to U.S. Provisional Application Ser. No. 61/297,524, filed 22 Jan. 2010, and entitled "MAP ACQUISITION AND PROCESSING FOR LOCATION BASED SERVICES," which is assigned to the assignee hereof and which is incorporated herein by reference.

BACKGROUND

1. Field:

The subject matter disclosed herein relates to map handling for location based services in conjunction with localized environments.

2. Information:

Humankind has always struggled to journey from point "A" to point "B". In ancient times, individuals in unfamiliar territory wandered around without guidance, or perhaps they risked asking local inhabitants for directions. People eventually developed maps to provide written guidance for reaching a desired destination. As literacy and the availability of paper became more common, more people gained the ability to use maps during their travels.

Written maps began to be available in electronic form during the 20$^{th}$ century. With the advent of the Internet, people could electronically access maps of many places from all over the globe. Web mapping services could also provide directions from point "A" to point "B". These directions from web-based mapping services were relatively static. With the invention of satellite-positioning system (SPS) technology and ever-smaller electronic devices, however, so-called turn-by-turn directions could be provided dynamically as travelers journeyed toward their destination.

These electronic maps and web-based mapping services focus on providing directions in the outdoors, such as from one postal address to another postal address. Similarly, such turn-by-turn directions have traditionally been limited to roadways. With general outdoor environments such as those that include roadways, a map and/or roadway layout may be generated from an image acquired by a satellite for use with mapping and directional services. Unfortunately, an ability to provide analogous mapping and directional services in specific and/or localized environments is currently lacking.

BRIEF DESCRIPTION OF THE FIGURES

Non-limiting and non-exhaustive aspects, features, etc. will be described with reference to the following figures, wherein like reference numerals refer to like parts throughout the various figures.

SUMMARY

Figure 1:
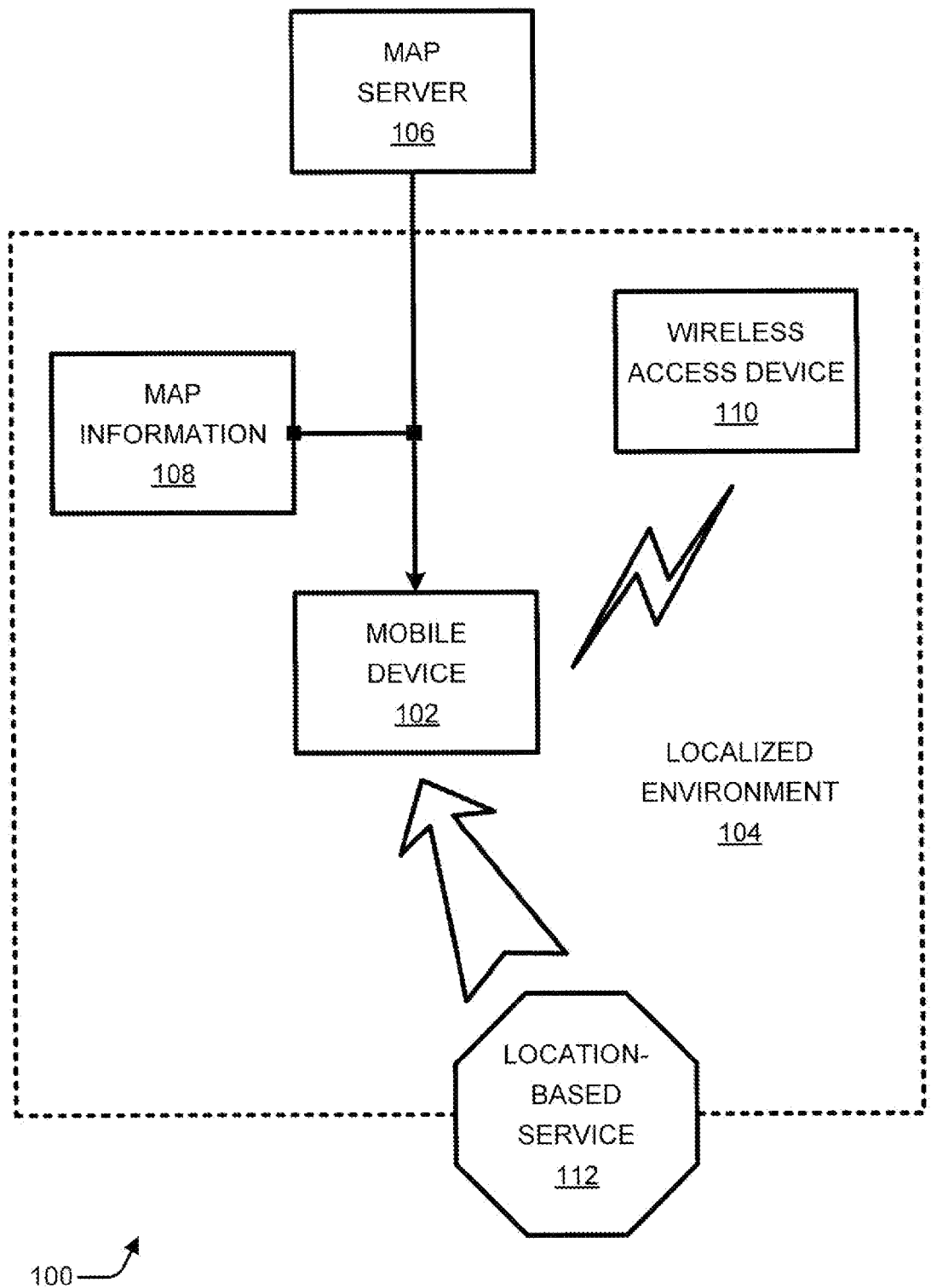
FIG. 1 is a schematic block diagram illustrating a mobile device that may receive map information in conjunction with an example localized environment such that a location-based service may be provided according to an implementation.

For certain example implementations, a method may comprise storing map information corresponding to a particular localized environment that is associated with a particular location context identifier, with the particular localized environment comprising an indoor environment corresponding to at least a portion of a building structure; and receiving update information applicable to the map information corresponding to the particular localized environment, with the update information being associated with the particular location context identifier. The method may further comprise updating the map information corresponding to the particular localized environment based at least partly on the update information so as to produce updated map information and providing the updated map information to one or more mobile devices that are located at the particular localized environment. For certain example implementations, an apparatus may comprise at least one memory to store instructions and one or more processors to execute the instructions and cause the apparatus to store map information corresponding to a particular localized environment that is associated with a particular location context identifier, with the particular localized environment comprising an indoor environment corresponding to at least a portion of a building structure. The apparatus may also be caused to receive update information applicable to the map information corresponding to the particular localized environment, with the update information being associated with the particular location context identifier. The apparatus may further be caused to update the map information corresponding to the particular localized environment based at least partly on the update information so as to produce updated map information and to provide the updated map information to one or more mobile devices that are located at the particular localized environment. For certain example implementations, a system may comprise means for storing map information corresponding to a particular localized environment that is associated with a particular location context identifier, with the particular localized environment comprising an indoor environment corresponding to at least a portion of a building structure; and means for receiving update information applicable to the map information corresponding to the particular localized environment, with the update information being associated with the particular location context identifier. The system may further comprise means for updating the map information corresponding to the particular localized environment based at least partly on the update information so as to produce updated map information; and means for providing the updated map information to one or more mobile devices that are located at the particular localized environment. For certain example implementations, an article may comprise at least one storage medium having stored thereon instructions executable by one or more processors to store map information corresponding to a particular localized environment that is associated with a particular location context identifier, with the particular localized environment comprising an indoor environment corresponding to at least a portion of a building structure; and to receive update information applicable to the map information corresponding to the particular localized environment, with the update information being associated with the particular location context identifier. The instructions may further be executable by the one or more processors to update the map information corresponding to the particular localized environment based at least partly on the update information so as to produce updated map information and to provide the updated map information to one or more mobile devices that are located at the particular localized environment. It should be appreciated, however, that these are merely example implementations and that other implementations are described herein and may be implemented without deviating from claimed subject matter.

For certain example implementations, a method for a mobile device may comprise: detecting at least one incident that apparently conflicts with map information, with the map information corresponding to a localized environment at which the mobile device is located; and transmitting data representative of the at least one incident that apparently conflicts with the map information. For certain example implementations, a mobile device may comprise at least one memory to store instructions and one or more processors to execute the instructions and cause the mobile device to: detect at least one incident that apparently conflicts with map information, with the map information corresponding to a localized environment at which the mobile device is located; and transmit data representative of the at least one incident that apparently conflicts with the map information. For certain example implementations, a system may comprise: means for detecting at least one incident that apparently conflicts with map information, with the map information corresponding to a localized environment at which the system is located; and means for transmitting data representative of the at least one incident that apparently conflicts with the map information. For certain example implementations, an article may comprise at least one storage medium having stored thereon instructions executable by one or more processors to: detect at least one incident that apparently conflicts with map information, with the map information corresponding to a localized environment at which a mobile device is located; and transmit data representative of the at least one incident that apparently conflicts with the map information. It should be appreciated, however, that these are merely example implementations and that other implementations are described herein and may be implemented without deviating from claimed subject matter.

DETAILED DESCRIPTION

Reference throughout this Specification to "a feature," "one feature," "an example," "one example," and so forth means that a particular feature, structure, characteristic, etc. described in connection with the feature and/or example may be relevant to at least one feature and/or example of claimed subject matter. Thus, the appearances of a phrase such as "in one example," "an example," "in one feature," "a feature," "in an example implementation," "for certain example implementations," and so forth in various places throughout this Specification are not necessarily all referring to the same feature, example, and/or example implementation. Furthermore, the particular features, examples, structures, characteristics, etc. may be combined in one or more example implementations, example systems, and so forth.

As indicated above, electronic maps and web-based mapping services are not usually offered for specific, localized environments. Similarly, turn-by-turn directions are not typically provided for specific, localized environments. Specific, localized environments may include, by way of example but not limitation, indoor spaces such as building structures, private land areas such as apartment complexes, and so forth. Many indoor spaces are sufficiently large, complex, and/or otherwise difficult to navigate such that navigational information may be beneficial, e.g., to a user of a mobile device. Hence, a user may want navigational information or another location-based service (LBS) to be provided via a mobile device in an indoor or other localized environment. Unfortunately, in contrast with large-scale, outdoor areas in which location information may be available from e.g. satellite imagery and/or SPS technologies, indoor mapping and/or position information is generally not available. Satellites cannot merely take a picture of interior features of a structure, and SPS signals may be too attenuated for use within a structure. Moreover, to fully provide a range of location-based services, localized position-level metadata and service-level metadata may be employed.

Using relatively high precision location information, applications for a mobile device may provide a user with many different services such as, for example, positioning, personal vehicle/pedestrian navigation, real-time turn-by-turn directions, location-based searching, just to name a few examples. In such situations, relatively high precision location information (e.g., that obtained from SPS infrastructure and/or the like) may be processed according to a global coordinate system (e.g., latitude and longitude or other earth-centered xyz coordinates). Although such use of location information referenced to a global coordinate system may be useful in providing some services (e.g., outdoor vehicle navigation), such location information referenced to a global coordinate system may be impractical for other types of services, such as indoor pedestrian navigation. For example, even if a local map is itself known, it may still be unknown how such a local map fits in relation to the earth in a global coordinate system.

Accordingly, one or more local coordinate systems may be established for particular services such as indoor pedestrian navigation, searching of local points of interest that are not directly mapped or referenced to a global coordinate system, and so forth, just to name a couple of examples. A server may store and associate location context identifiers (LCIs) with specific "location contexts." Such a location context may include locally-defined areas or other environments such as, for example, particular floors of buildings or other indoor areas that are not mapped according to a global coordinate system. Location context identifiers may be used as handles for requesting additional information associated with (e.g., laid over) such a location context. Additional information may include, by way of example but not limitation, routes or paths over an indoor map, points of interest that are local or unique to certain location contexts, and so forth, just to name a couple of examples. However, claimed subject matter is not limited to any particular coordinate system or systems. Moreover, a given localized environment and/or local context may be associated with at least a portion of at least one local coordinate system, at least a portion of at least one global coordinate system, at least a portion of at least one local coordinate system that may be translated into one or more other local coordinate systems and/or global coordinate systems, any combination thereof, and so forth, just to name a few examples.

Thus, a mobile device that moves into a localized environment may contact a server to obtain one or more location context identifiers that are associated with the localized environment. To obtain a location context identifier that is associated with or relevant to a given localized environment, the mobile device may first receive information from local transmitters that is/are associated with and/or representative of the given localized environment. For example, a mobile device may obtain medium access control (MAC) identifiers (MAC IDs) from signals transmitted from one or more Wi-Fi access points and/or received signal strength indications (RSSIs) related to same. As another example, a mobile device may obtain a femtocell identifier or an identifier associated with any wireless access device generally. Alternatively, a mobile device may receive signals transmitted from an SPS and/or information from an application programming interface (API) capable of providing location information, for example. A mobile device may transmit information related to a current localized environment to a server to request a location context identifier. In response, a server may use such received information to determine a location context (e.g., corresponding to a floor of a building or other indoor space). The server may further respond to the request by providing one or more location context identifiers associated with the determined location context. Upon obtaining at least one location context identifier, a mobile device may use the location context identifier as a handle to request map information, such as location-based data from one or more servers.

Location-based data may be overlaid on a map of a localized environment. A mobile device may also use a location context identifier to obtain a map of a localized environment. Additionally and/or alternatively, a mobile device may use a location context identifier to obtain information to be used in a particular application connected to a particular corresponding location context. For example, a mobile device may obtain information relating to a particular location context for use in an indoor pedestrian navigation application. Such an application may provide, for example, a display of corridors, rooms, hallways, doors, entry ways, restrooms, and/or (other) points of interest. For a particular application, such information may define a routing topology set out in a coordinate system that is local to a particular location context, as distinguishable from a global coordinate system. A mobile device may also use one or more location context identifiers to obtain point of interest information. Unfortunately, such map information may be initially incorrect, may become stale, or may otherwise be inaccurate and/or incomplete.

Map information may be created, for example, based on an initial map of a localized environment, such as from a computer-aided design (CAD) file or image schematic of a given localized environment, just to name a couple of examples. Initial map information may be augmented with point of interest information and other types of location-based data. In operation, map information may be disseminated in whole and/or in part(s) to mobile devices present at a given localized environment. As noted herein above, an initial map and/or initial location-based data may be incorrect. Over time, map information may become stale as a corresponding localized environment undergoes changes. Furthermore, certain aspects and/or portions of a localized environment may be omitted from corresponding map information. Consequently, map information for these and other reasons may be inaccurate, incomplete, or otherwise amenable to updating.

Accordingly, in certain example implementations, map information may be updated. Updates may be precipitated by an entity affiliated with a given localized environment. Such updates may include modifications to existing map information and/or replacements of existing map information. Affiliated entities may further be polled to check for updates. Updates may also or alternatively be precipitated by data obtained via one or more mobile devices. For example, users of mobile devices may manually send suggested changes to point of interest information. Positioning and/or movement patterns may also inform updates. For instance, a room that is reflected as being infeasible by map information may be changed if mobile devices are consistently located within such a room. Also, if mobile devices are repeatedly moving through what is indicated to be a building obstacle, such as a wall, the presence of the building obstacle may be reevaluated and possibly removed. However, claimed subject matter is not limited to any of these particular example implementations. Moreover, additional example update implementation scenarios are described further herein below.

FIG. 1 is a schematic block diagram 100 illustrating a mobile device that may receive map information in conjunction with an example localized environment such that a location-based service may be provided according to an implementation. As illustrated, schematic block diagram 100 may include a mobile device 102 that is at least proximate to a localized environment 104. Schematic block diagram 100 may further include a map server 106, map information 108, a wireless access device 110, and a location-based service 112.

For certain example implementations, a mobile device 102 may obtain map information 108 from at least one map server 106. Upon receipt of map information 108, mobile device 102 may store map information 108 in one or more memories for use in providing at least one location-based service 112, e.g., to a user of mobile device 102. Examples of mobile devices 102 may include, but are not limited to, a mobile station, a mobile phone, a netbook, a laptop, a tablet computer, a slate computer, a personal digital assistant (PDA), a personal navigation device (PND), an entertainment appliance, some combination thereof, and so forth, just to name a few examples. Furthermore, a mobile device 102 may comprise any mobile device with wireless capabilities. Additional mobile device examples are described herein below with particular reference to FIG. 13. However, claimed subject matter is not limited to any particular type, size, category, capability level, etc. of mobile device.

In example implementations, map information 108 may comprise any information relating to a map of a localized environment. By way of example but not limitation, map information 108 may include one or more of any of the following: a connectivity graph for a map, a routing graph for a map, annotation information for a map, points of interest for a localized environment, navigational instructions, at least one layer of mapping information, some combination thereof, and so forth. Additional description and examples of map information 108 are described herein below. In example implementations, localized environment 104 may comprise indoor environments such as office buildings and malls or defined outdoor environments such as apartment complexes and business parks. Additional description and examples of localized environments 104 are described herein below, particularly with reference to FIG. 4.

In example implementations, a wireless access device 110 may comprise a Wi-Fi and/or WLAN access point (AP), a femtocell nodal device, a WiMAX nodal device, a Bluetooth or other similarly short-ranged wireless node, and so forth, just to name a few examples. Wireless access devices 110 may transmit signals including wireless access device identifiers. A mobile device 102 may be within wireless communication range of one or more wireless access devices 110 and thus in wireless communication with one or more wireless access devices 110, which may be located at a single localized environment 104 or at multiple localized environments 104. During such wireless communication(s), mobile device 102 may receive from one or more wireless access devices 110 one or more wireless access device identifiers that are associated with the one or more wireless access devices 110. For a Wi-Fi access point implementation of a wireless access device 110, by way of example but not limitation, a wireless access device identifier may comprise an access point medium access control identifier (MAC ID). Such a wireless access device 110 may further interact with a mobile device 102 so as to provide other measurements and/or other detected information, such as round-trip time (RTT) measurements, received signal strength indicator/indication (RSSI) measurements, and so forth, just to name a couple of examples.

As depicted in schematic block diagram 100, map server 106 is located external to localized environment 104. However, map server 106 may alternatively be located fully or partially internal to localized environment 104 without departing from claimed subject matter. Similarly, although wireless access device 110 is shown as being located internal to localized environment 104, it may alternatively be located fully or partially external to localized environment 104 without departing from claimed subject matter. Although only one map server 106 and wireless access device 110 is shown in schematic block diagram 100, more than one of either or both may alternatively be involved in a given implementation without departing from claimed subject-matter. Also, although no particular mode of communication between mobile device 102 and map server 106 is connoted by the interconnecting arrow depicted in schematic block diagram 100, it should be noted that communications between them may be made at least partly wirelessly. By way of example but not limitation, a communication between mobile device 102 and map server 106 may be carried wirelessly part of the way (e.g., between mobile device 102 and a wireless access device 110, a cellular base station, etc.) and by wireline part of the way (e.g., over one or more wired networks such as an intranet or the Internet).

Examples of location-based services 112 may include, but are not limited to, providing navigational information. For instance, point-of-interest information, a connectivity graph, a routing graph, turn-by-turn directional instructions, "static" directions from one location to another location, etc. may be provided. Other examples of location-based services 112 may include, but are not limited to, routing, positioning, position filtering, navigation, incentives applications (e.g., offers based on location), location-based search, combinations thereof, and so forth. Navigational information or other information related to a location-based service (LBS) may be provided by presenting it to a user (e.g., visually, haptically, and/or aurally via a mobile device), by transmitting it to a mobile device, some combination thereof, and so forth, just to enumerate a few examples. Additional examples of location-based services 112, as well as example aspects thereof, are described herein below, including with reference to FIG. 4.

Figure 2:
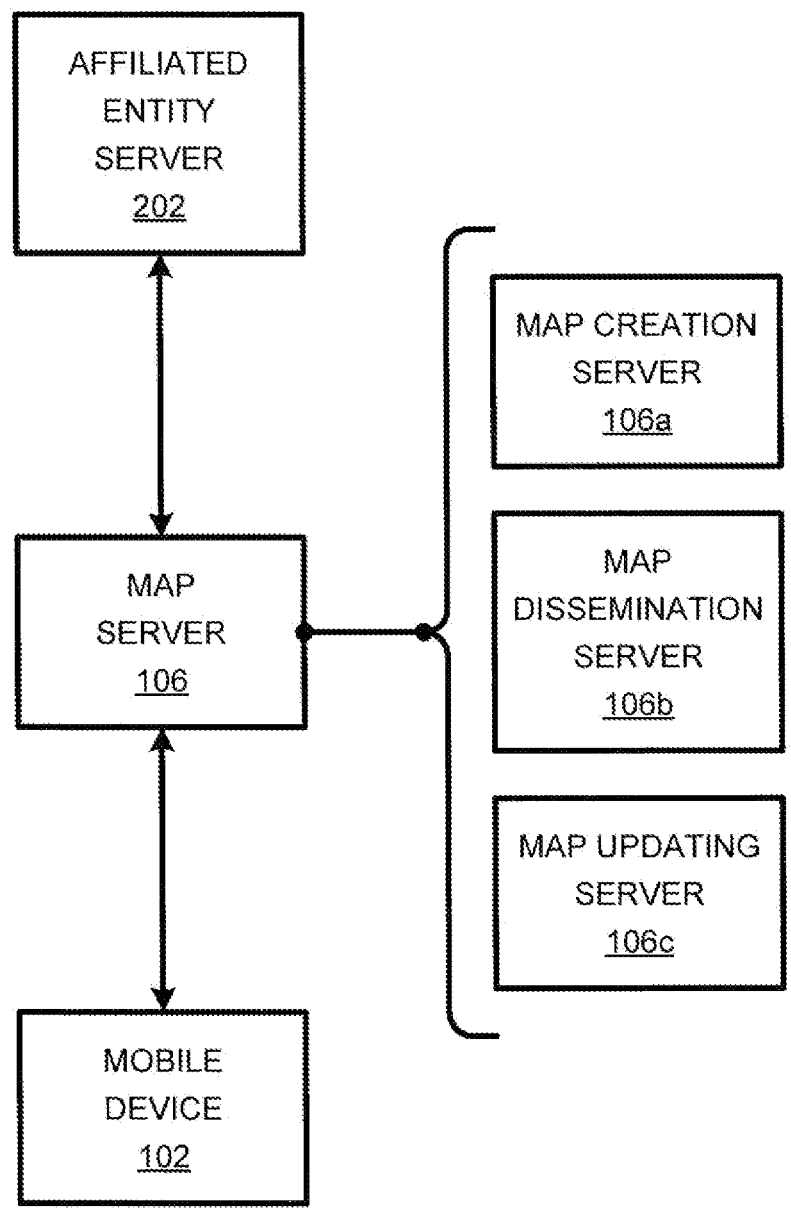
FIG. 2 is a schematic block diagram illustrating an example map server that may be capable of interacting with an affiliated entity server and/or a mobile device according to an implementation.

FIG. 2 is a schematic block diagram 200 illustrating an example map server that may be capable of interacting with an affiliated entity server and/or a mobile device according to an implementation. As illustrated, schematic block diagram 200 may include at least one mobile device 102, at least one map server 106, and at least one affiliated entity server 202. Schematic block diagram 200 may further include at least one map creation server 106a, at least one map dissemination server 106b, and at least one map updating server 106c.

For certain example embodiments, a map server 106 may interact with a mobile device 102 and/or an affiliated entity server 202. An affiliated entity server 202 may comprise at least one server that is associated with an entity that is affiliated with a given localized environment 104 (e.g., of FIG. 1). Such affiliated entities may include, by way of example but not limitation, an owner of a localized environment, a property manager of a localized environment, an operational manager of a localized environment, an architectural firm that designed a localized environment, an engineering firm that is working with a localized environment, an interior design firm working with a localized environment, a construction company working on a localized environment, a current occupant of a localized environment, a company that is (e.g., contracted to be) responsible for keeping map information current, designated representatives of any of the above, combinations thereof, and so forth.

In certain example embodiments, interactions between and/or among a mobile device 102, at least one map server 106, and an affiliated entity server 202 may relate to creating maps, disseminating maps, updating maps, combinations thereof, and so forth, just to name a few examples. A given map server 106 may comprise or otherwise be capable of functioning as one or more of: a map creation server 106a, a map dissemination server 106b, or a map updating server 106c. Implementations that may utilize such servers are described herein below, including with reference to FIGS. 3, 5, 6, 7, and 10. Communications (e.g., transmissions and/or receptions) between and/or among one or more mobile devices 102, one or more map servers 106, and/or at least one affiliated entity server 202 may be implemented over one or more networks. Examples of such network(s) may include, but are not limited to, one or more of: a wireless network, a wired network, an internet (including the Internet), a telecommunications network, an ad hoc network, a local area network (LAN), an Ethernet, a wide area network (WAN), a WiMAX network, a Wi-Fi network, a Bluetooth network, a public network, a private network, a computer network, a cellular network, any combination thereof, and so forth.

Such network or networks may operate in accordance with any one or more of many different systems, standards, protocols, etc., just to name a few examples. For example, for an implementation including at least one wireless communication network, such wireless communication network(s) may comprise one or more of a wireless wide area network (WWAN), a wireless local area network (WLAN), a wireless personal area network (WPAN), any combination thereof, and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, any combination thereof, and so on. A CDMA network may implement one or more radio access technologies (RATs) such as cdma2000, Wideband-CDMA (W-CDMA), Time Division Synchronous Code Division Multiple Access (TD-SCDMA), any combination thereof, etc., just to name a few radio technology examples. Here, cdma2000 may include technologies implemented according to IS-95 standards, IS-2000 standards, IS-856 standards, any combination thereof, and so forth. A TDMA network may implement Global System for Mobile Communications (GSM), Digital Advanced Mobile Phone System (D-AMPS), or some other RAT or RATs. GSM and W-CDMA examples are described in documents from a consortium named "3rd Generation Partnership Project" (3GPP). Cdma2000 examples are described in documents from a consortium named "3rd Generation Partnership Project 2" (3GPP2). 3GPP and 3GPP2 documents are publicly available. A WLAN may include an IEEE 802.11x network, and a WPAN may include a Bluetooth network and/or an IEEE 802.15x network, just to name a few examples. Wireless communication networks may include so-called next generation technologies (e.g., "4G"), such as, for example, Long Term Evolution (LTE), Advanced LTE, WiMAX, Ultra Mobile Broadband (UMB), any combination thereof, and/or the like.

A map creation server 106a, a map dissemination server 106b, and/or a map updating server 106c may be realized on separate hardware that is located at a single facility or that is geographically distributed. Alternatively, a map creation server 106a, a map dissemination server 106b, and/or a map updating server 106c may be co-located on a single piece of hardware. Furthermore, a map creation server 106a, a map dissemination server 106b, and/or a map updating server 106c may be realized as a single logical server (e.g., a map server 106 having multiple functionalities). Generally, a server and/or a server device may include any one or more parts operating together to provide some service, such as a bank of servers, a server farm, multiple processors and memory elements communicating over some local and/or distributed interconnect, and so forth, just to name a few examples. Such device(s) realizing a map creation server 106a, a map dissemination server 106b, and/or a map updating server 106c may comprise at least one node of a telecommunications network, at least one server on an internet (e.g., the Internet), some combination thereof, and so forth, just to name a couple of examples. A device may comprise one or more servers, and an apparatus may comprise one or more devices.

Figure 3:
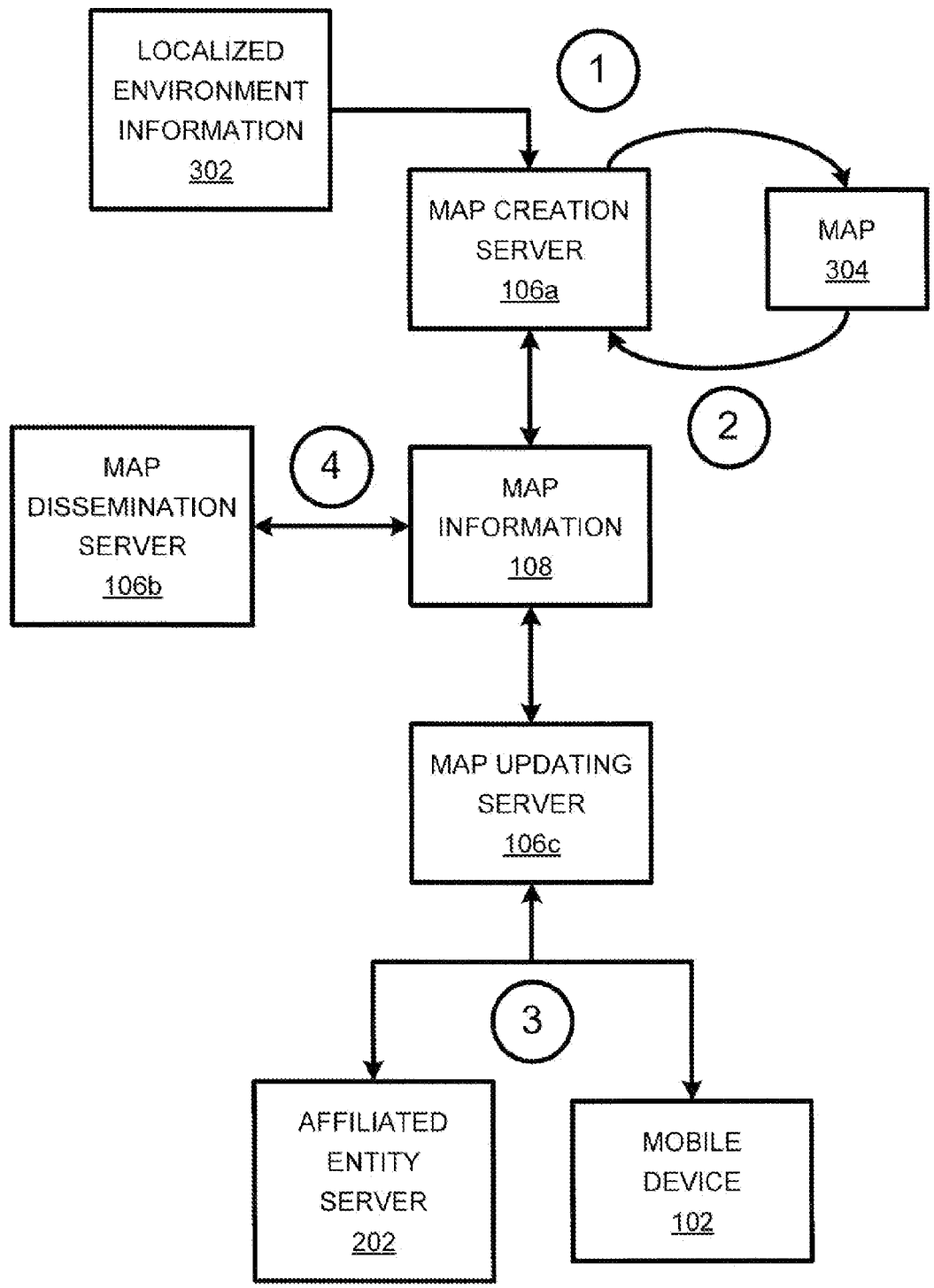
FIG. 3 is a schematic diagram illustrating example approaches to creating and/or updating map information so that it may be disseminated to mobile devices to facilitate location-based services according to an implementation.

FIG. 3 is a schematic diagram 300 illustrating example approaches to creating and/or updating map information so that it may be disseminated to mobile devices to facilitate location-based services according to an implementation. As illustrated, schematic diagram 300 may include a mobile device 102, a map creation server 106a, a map dissemination server 106b, a map updating server 106c, and an affiliated entity server 202. Schematic diagram 300 may further include localized environment information 302 and a map 304. Four encircled numbers (1)-(4) indicate example operational phases that are referenced below.

For certain example implementations, a mobile device 102 and/or an affiliated entity server 202 may interact with a map server 106 (e.g., of FIGS. 1 and 2), such as by interacting with a map creation server 106a, a map dissemination server 106b, and/or a map updating server 106c. A map creation server 106a may create a map 304 and/or map information 108. A map dissemination server 106b may disseminate map information 108 to one or more mobile devices 102. A map updating server 106c may update map information 108. For purposes of map updating, map updating server 106c may interact with an affiliated entity server 202 and/or a mobile device 102. Example scenarios and implementations for updating are described further herein.

Example operative aspects pertaining to schematic diagram 300 are described below in terms of operational phases (1)-(4). At operational phase (1), localized environment information 302 may be received, such as from affiliated entity server 202. Localized environment information 302 may be constituted in any digital form, such as auto CAD, polygon designated, and so forth, just to name a couple of examples. At operational phase (1), map creation server 106a may convert localized environment information 302 from a generalized form into an intermediate, editable form (e.g., an extensible markup language (XML) form), which is shown as map 304. Such an intermediate form as map 304 may contain basic features of a map of a corresponding localized environment. Such basic features may include, but are not limited to, walls, doors, columns, and any available contextual information explicitly present in an original map. Such features may be used (e.g., at operational phase (2)) for additional analysis and information inference and/or extraction.

At operational phase (2), localized environment information 302 may be used to extract and infer further information about map 304. This may include, but is not limited to, inferring locations of hallways and rooms as well as their boundaries, ascertaining feasible and infeasible areas of a map, determining entrances and exits of rooms and buildings (or points of entry/exit), and so forth, just to name a few examples. Additional example description pertaining at least to operational phases (1) and (2) is provided herein below with particular reference to FIG. 4.

At operational phase (3), because building features may not be constant and because data for a given map of localized environment information 302 may change over time, a system may implement a mechanism to allow for periodic, occasional, irregular, or other updates to map information 108. With an update, a map may be reprocessed; however, such reprocessing may comprise recreating map information, merging previous map information with new data, recreating map information and merging subsequently discovered data therewith, and so forth, just to name a few examples. Thus, map creation may be re-performed as at operational phases (1) and/or (2). Alternatively, a system may elect to merge previous map features and inferred information from a previous map with new information (e.g., new data features, newly-inferred information, etc.).

Updating of map information 108 may be at least partially performed, for example, by a map updating server 106c. In an example implementation, a full recreation may be forwarded from map updating server 106c to map creation server 106a for at least partial performance by map creation server 106a. A merging may be performed by map updating server 106c. Map updating may be performed, for example, responsive to communication(s) with one or more mobile devices 102 and/or at least one affiliated entity server 202. For instance, map updating may be based at least partly on crowd-sourced information (e.g., one or more users indicate a room is a family restroom instead of a coffee shop), may be based at least partly on inferred information (e.g., an area ascertained to be infeasible may actually have many users frequently positioned within it), or may be based at least partly on other information received from mobile device(s) 102. As another example, a system may enable an affiliated entity server 202 to update map information 108 by proactively sending (a portion of or a full set of) new localized environment information 302, by polling an affiliated entity server 202 to check for changes to localized environment information 302, combinations thereof, and so forth, just to name a couple of examples. For instance, if a room assignment for an individual changes, localized environment information 302 may be updated by an affiliated entity server 202. An example location-based system for localized environments (e.g., a map updating server 106c thereof) may detect such a change and update map information 108 by reprocessing it. Additional example implementations for map updating are described herein below with particular reference to FIGS. 6-12.

At operational phase (4), once an analysis or processing is complete, information may be bundled into a map interchange format, such as any open or other publicly-accessible format for a map. By way of example but not limitation, map information 108 may be formatted to comport with one or more map interchange formats and provided to map dissemination server 106b. Such a map interchange format may be of any form and/or comport with any standard. Depending on later usage criteria, it may be that multiple map formats are generated as a result of an analysis process. In addition, more than one formatted file may be created for a single map. For example, maps may be partitioned into logical pieces or layers. Different layers may include any one or more of the following: at least one wall layer, at least one door layer, one or more points of interest layers, and so forth, just to name a few examples. A result of an analysis process may generate, by way of example but not limitation, a base layer, a door layer, and a point of interest layer in XML, JavaScript Object Notation (JSON), scalable vector graphics (SVG), and/or other interchange formats for a single map. Example aspects for an interaction between a map dissemination server 106b and a mobile device 102 are described herein below with particular reference to FIG. 5.

Figure 4:
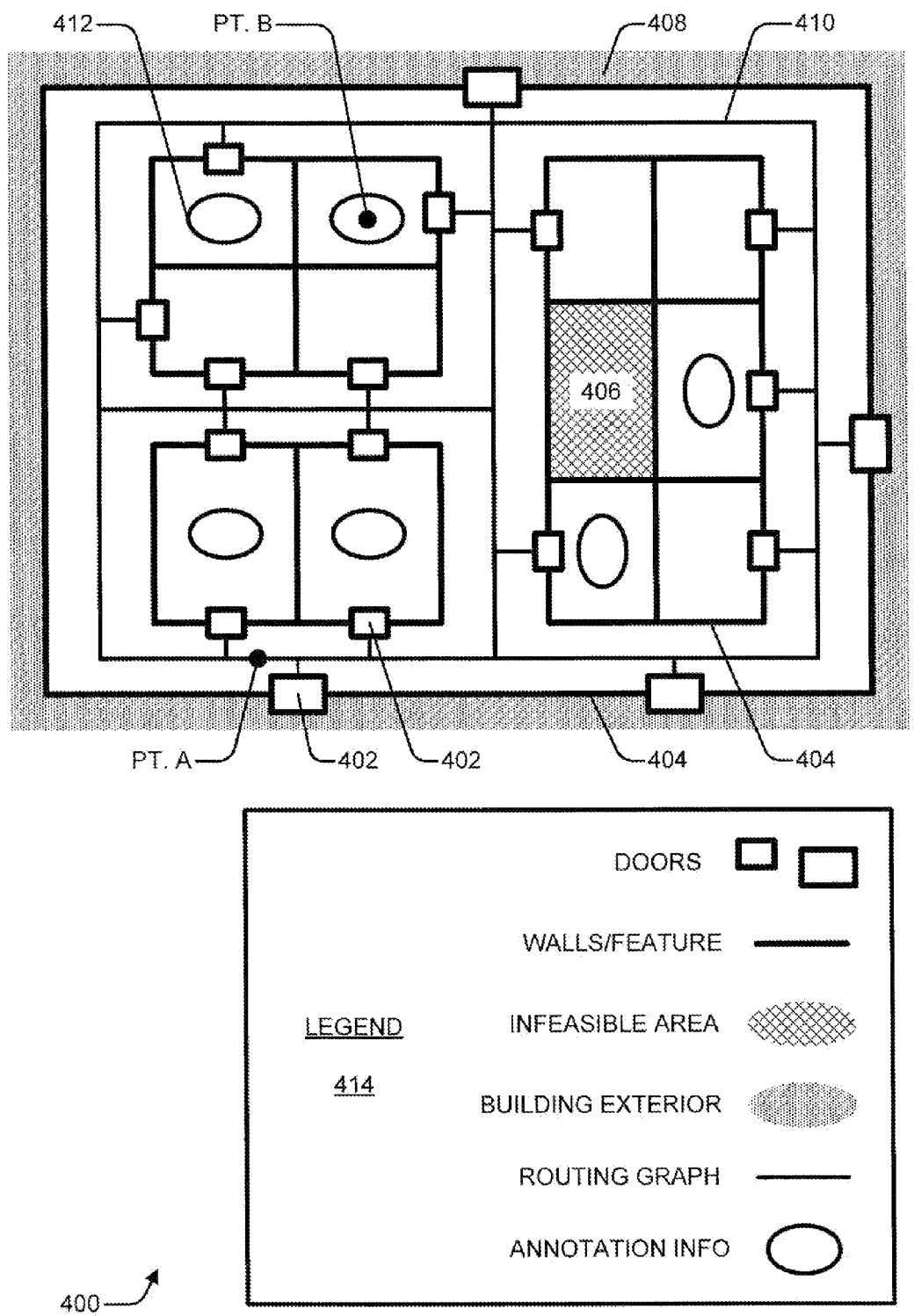
FIG. 4 is a schematic diagram of an example localized environment and associated map information according to an implementation.

FIG. 4 is a schematic diagram 400 of an example localized environment and associated map information according to an implementation. As illustrated, schematic diagram 400 includes a map of an indoor environment and a routing graph that has been created for the indoor environment. Indoor environments may include office buildings, apartment buildings, malls, airports, arenas, convention centers, stadiums, and so forth, just to name a few examples. An indoor environment may have walls, doors, columns, stairs, elevators, and so forth. These types of building features and other objects may restrict movement around an indoor environment. Indoor environments may also have open areas such as lobbies, common areas, entryways, rooms, and so forth, just to name a few examples. Accordingly, because paths of movement for such an indoor environment may be restricted in some areas (although they may also be unrestricted in other, open areas), such an indoor environment may be an example of a constrained environment. More generally, a localized environment may further include, in addition to indoor environments, environments such as: apartment complexes; business, commercial, and/or industrial parks; resorts, parks, or other entertainment areas; and so forth, just to name a few examples.

Map information, which may include a connectivity and/or routing graph with linked or otherwise associated annotation information, may be used to derive and/or provide navigational information. Navigational information may include, by way of example but not limitation, positioning information, directional information, turn-by-turn directions, and so forth. Such navigational information may facilitate travel from a point "A" to a point "B". By way of example but not limitation, a routing graph with associated annotation information may be descriptive of feasible areas of a given map and indicate how traversal is possible from one position to another position. Such a routing graph and/or associated annotation information may comprise an example of routability information. For any given building or other localized environment, a routing graph may comprise a set of nodes and edges that depict feasible areas and traversable paths from one point in a building to another point. A traversable path may comprise, by way of example but not limitation, a path between any two points that is not blocked by a wall or other building obstacle.

As shown in example schematic diagram 400, an example routing graph 410 has been created that may include linkages to annotation information 412 from building information that is descriptive of at least a portion of a building structure (or, more generally, from localized environment information that is descriptive of at least a portion of a localized environment area). Such building information may comprise data that is in any format. Building information may comprise a computer aided design (CAD) file, a drawing interchange format (DXF) file, an image file, some combination thereof, and so forth, just to name a few examples.

As illustrated, schematic diagram 400 may include external/internal doors 402, exterior/interior walls 404, at least one infeasible area 406, a building exterior area 408, a routing graph 410, and annotation information 412. Using routing graph 410, a navigational application and/or system may provide directional instructions for an individual to travel, for instance, from point "A" to point "B". Although all such illustrated features are not explicitly denoted with reference numerals in FIG. 4 for the sake of visual clarity, a legend 414 indicates which building and navigational features are connoted by which particular drawing features. Also, although schematic diagram 400 generally and routing graph 410 specifically may include certain example components as illustrated in FIG. 4 and described herein below, claimed subject matter is not so limited. Instead, given implementations may include more, fewer, and/or different components. For example, building information may omit door indications. Also, infeasible areas may not be identified. Furthermore, additional annotation information and/or additional types of such information may be linked to routing graph 410. Other alternatives and alternative components may be added, incorporated, omitted, changed, and so forth without deviating from claimed subject matter.

By way of example but not limitation, routing graph 410 may be indicative of a routing topology. Routing graph 410 may be retrieved or received (e.g., from memory, from a remote location, etc.) and/or created so as to correspond to a building structure of schematic diagram 400. In an example implementation, a routing graph 410 may be received as comprising at least part of map information 108 (e.g., of FIGS. 1 and 3). To create a routing graph 410, a grid of points may be applied to building information. The building information may be analyzed using such an applied grid of points. By way of example but not limitation, possible locations on a map may be represented using a discrete set of grid points. This discreteness need not present a problem for an accuracy of an overall system because a granularity of an applied grid of points may be increased so as to exceed a desired level of precision.

As part of an example analysis of building information, autonomous areas may be determined Autonomous areas may include rooms, hallways, a building exterior, other zones, and so forth, just to name a few examples. At least one autonomous area may be ascertained to comprise a building exterior area 408. One or more other autonomous areas may be determined to comprise an infeasible area 406. For example, an area without a door and/or an area without annotation information may be determined to be infeasible. On the other hand, autonomous areas that are reachable and/or that are associated with annotation information may be determined to comprise feasible areas (e.g., accessible rooms, stores, hallways, etc.).

If doors are indicated in building information, one or more external doors 402 (e.g., the larger door rectangles in FIG. 4 representing exits and/or entrances for a building structure) may be determined if such door(s) connect to and provide access to building exterior area 408. One or more internal doors 402 (e.g., the smaller door rectangles in FIG. 4) may be determined to provide access to other feasible areas, such as internal rooms, hallways, and so forth.

Annotation information 412 may be linked to a connectivity graph or routing graph 410 to further enable navigational aid between and/or among different areas (e.g., rooms, zones, etc.) and/or to further enable another location-based service. Annotation information 412 may also provide information associated with a particular zone, such a lobby, an elevator bank, a store, a room occupant, a dining location, and so forth, just to name a few examples. By way of example but not limitation, annotation information 412 may include room designations (e.g., "A", "1.24", etc.), room names (e.g., "Conference Room 1", etc.), room purposes, (e.g., "Bathroom", "Kitchen", etc.), room residents or occupants (e.g., "Amy", "Ray", etc.), exhibitors (e.g., "Acme", "AA Industrializing", etc.) of a booth, store owners (e.g., "Rugs-R-Us", "Nicky's Nick-Knacks", etc.), and so forth.

Routability information may comprise, for example, information that is capable of aiding and/or facilitating a determination of a route. By way of example but not limitation, routability information may include any one or more of the following: a connectivity graph, a routing graph 410, annotation information 412 (e.g., that is linked to a routing graph 410), general localized environment information, indication(s) of feasible and infeasible areas, indications of traversable paths, any combination thereof, and so forth, just to name a few examples. A routing graph 410 may be used to plot a path from one point to another point, including from one annotated area or zone to another annotated area or zone. Map information may comprise routability information, at least partially processed building or other localized environment information, any portion or combination thereof, and so forth, just to name a few examples. By way of example but not limitation, map information may comprise a map and a connectivity graph, a map with points of interest (e.g., from which a routing graph may be created), a routing graph and associated annotation information (e.g., from which a route to a point of interest may be determined), some combination thereof, and so forth.

Figure 5:
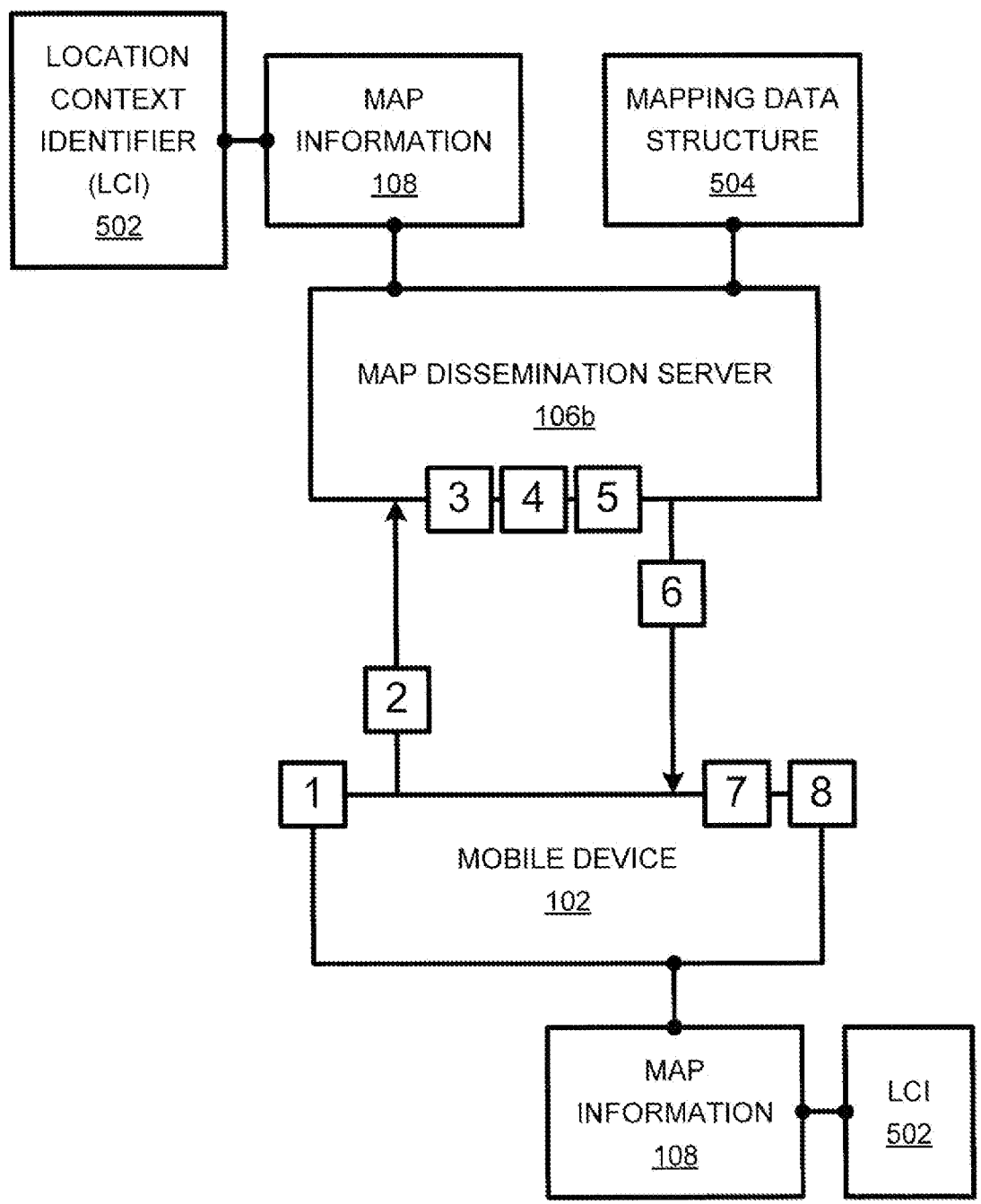
FIG. 5 is a schematic diagram of an example usage scenario for map information between a mobile device and a map dissemination server according to an implementation.

FIG. 5 is a schematic diagram of an example usage scenario 500 for map information between a mobile device and a map dissemination server according to an implementation. As illustrated, usage scenario 500 may include a mobile device 102 and a map dissemination server 106b. Usage scenario 500 may further include multiple phases, such as phases [1]-[8]. As shown, phases [1], [7], and [8] may be performed at least primarily by mobile device 102. Phases [3], [4], and [5] may be performed at least primarily by map dissemination server 106b. Phases [2] and [6] may relate to communication(s) between mobile device 102 and map dissemination server 106b. Phases [1]-[8] may be performed in different orders, and/or one or more phases may be omitted from a given implementation.

For certain example implementations, at phase [1], mobile device 102 may obtain one or more wireless access device identifiers (not explicitly shown) by receiving them from one or more wireless access devices 110 (e.g., of FIG. 1). At phase [2], one or more obtained wireless access device identifiers may be transmitted from mobile device 102 to map dissemination server 106b. Map dissemination server 106b may thus receive one or more wireless access device identifiers.

At phase [3], map dissemination server 106b may obtain at least one location context identifier (LCI) 502 based at least partly on the received wireless access device identifier(s). Location context identifier 502 may correspond to a localized environment in which mobile device 102 is currently located. A location context identifier 502 may be a handle, a label, a word, a numerical identifier, an alphanumeric value, or any other representation corresponding to at least one particular localized environment 104 (and/or at least one set of map information 108). For example, map dissemination server 106b may access a database or other mapping data structure 504 that associates wireless access device identifiers with localized environments in multiple association entries to retrieve a location context identifier 502 that is associated with at least one received wireless access device identifier. Such a location context identifier 502 may also be associated with map information 108 (e.g., also of FIGS. 1 and 3) for a corresponding localized environment in a same or different mapping data structure 504 so that map information 108 may be retrieved based at least partly on a location context identifier 502 that has been submitted.

Generally, a mapping data structure 504 may include multiple association entries (not explicitly shown). For example implementations, each such entry may associate one or more wireless access device identifier with at least one location context identifier 502. Alternatively and/or additionally, each such entry may associate map information 108 and/or a localized environment 104 with at least one location context identifier 502. However, one or more mapping data structures 504 may be implemented in alternative manners without departing from claimed subject matter.

At phase [4], based at least partly on a location context identifier 502 that has been retrieved, one or more received wireless access device identifiers, and/or other information received from mobile device 102, an estimated location of mobile device 102 may be determined. One or more position enhancers may be applied to further refine such a location estimate. A position enhancer may be, for example, any information and/or technique that may be utilized to narrow or focus a location estimate of a mobile device.

At phase [5], at least one annotation layer may be obtained by map dissemination server 106b using, for example, a retrieved or received location context identifier 502. For instance, a point of interest layer may be obtained that corresponds to a localized environment in which mobile device 102 is currently located. By way of example but not limitation, map information 108 may comprise at least a connectivity graph and indications of traversable paths for the localized environment as well as feasibility information that identifies feasible/infeasible areas of the localized environment. In an example implementation, a localized environment may comprise an indoor environment corresponding to at least a portion of a building structure within which the mobile device is located.

At phase [6], map dissemination server 106b may transmit a location context identifier 502 that has been retrieved and/or map information 108, with or without one or more annotation layers. Mobile device 102 may thus receive such a location context identifier 502 and/or such map information 108, including any accompanying or otherwise associated annotation layers. Moreover, mobile device 102 may use a location context identifier 502 to request any additional desired annotation layer(s) from map dissemination server 106b. If not already combined by map dissemination server 106b, mobile device 102 may combine map information 108 with one or more received annotation layers (e.g., into a map mashup) to enhance map information 108.

At phase [7], a user of mobile device 102 may search annotation information to find, e.g., a desired point of interest. A desired point of interest may be designated by a user as a destination. At phase [8], a routing to a designated destination may be calculated and presented to a user. For example, a routing may be presented graphically on a map, as a static set of directions, as real-time turn-by-turn directions (e.g., visually and/or aurally), some combination thereof, and so forth.

Figure 6:
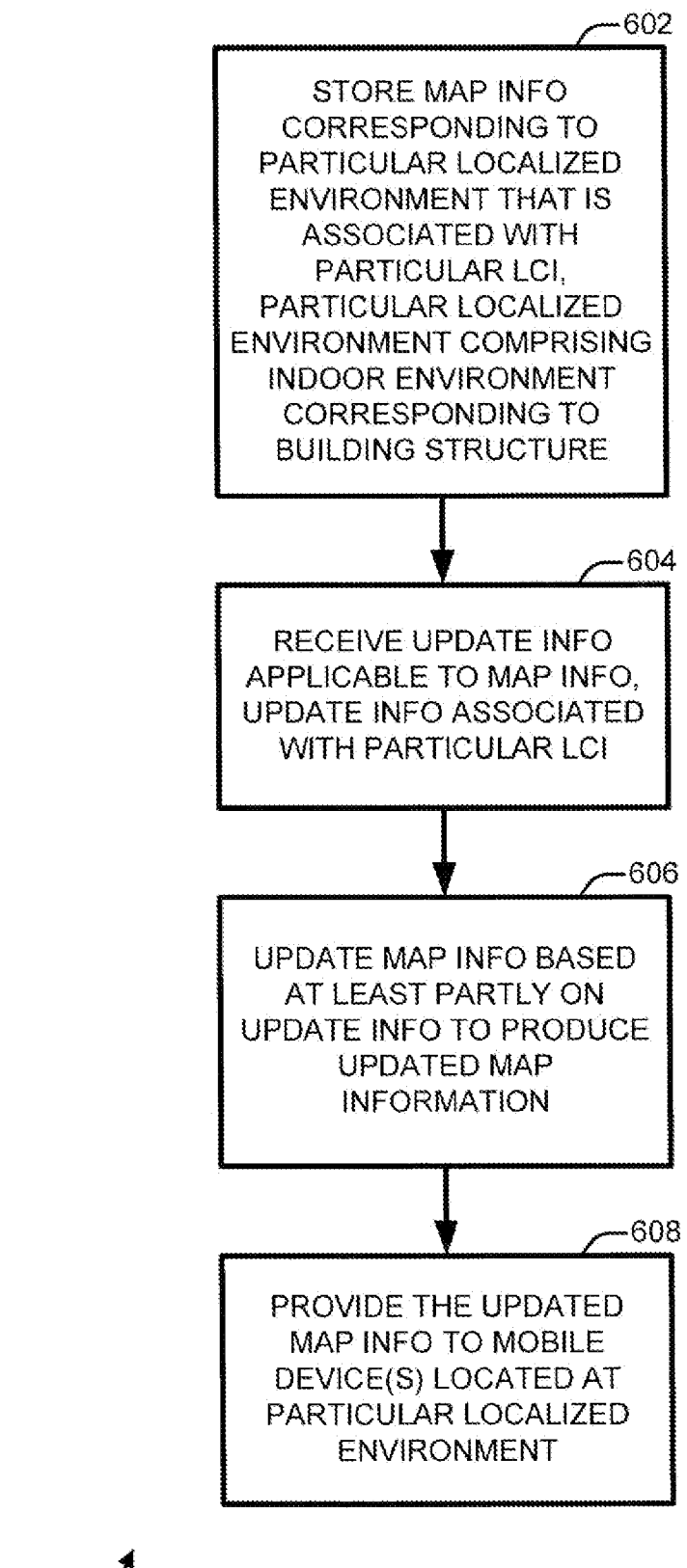
FIG. 6 is a flow diagram illustrating an example method for handling map information for localized environments with one or more servers according to an implementation.

FIG. 6 is a flow diagram 600 illustrating an example method for handling map information for localized environments with one or more servers according to an implementation. As illustrated, flow diagram 600 may include four operational blocks 602-608. Although operations 602-608 are shown and described in a particular order, it should be understood that methods may be performed in alternative manners (including with a different order and/or number of operations) without departing from claimed subject matter. Also, at least some operations of flow diagram 600 may be performed so as to be fully or partially overlapping with other operation(s). Additionally, although the description below references particular aspects and features illustrated in certain other figures (e.g., FIGS. 1-3 and 5), methods may be performed with other aspects and/or features.

For certain example implementations, operations 602-608 may be performed at least partially by one or more map servers 106 (e.g., a map creation server 106a, a map dissemination server 106b, and/or a map updating server 106c). At operation 602, map information corresponding to a particular localized environment that is associated with a particular location context identifier may be stored, with the particular localized environment comprising an indoor environment corresponding to at least a portion of a building structure. For example, at least one map server 106 may store map information 108 corresponding to a particular localized environment 104 that is associated with a particular location context identifier 502. Map information 108 may further be stored in association with the particular location context identifier 502.

At operation 604, update information that is applicable to the map information corresponding to the particular localized environment may be received, with the update information associated with the particular location context identifier. For example, update information that is applicable to map information 108 corresponding to the particular localized environment 104 may be received. The update information may be associated with the particular location context identifier 502, and the update information may further be accompanied by the particular location context identifier 502.

Figure 7:
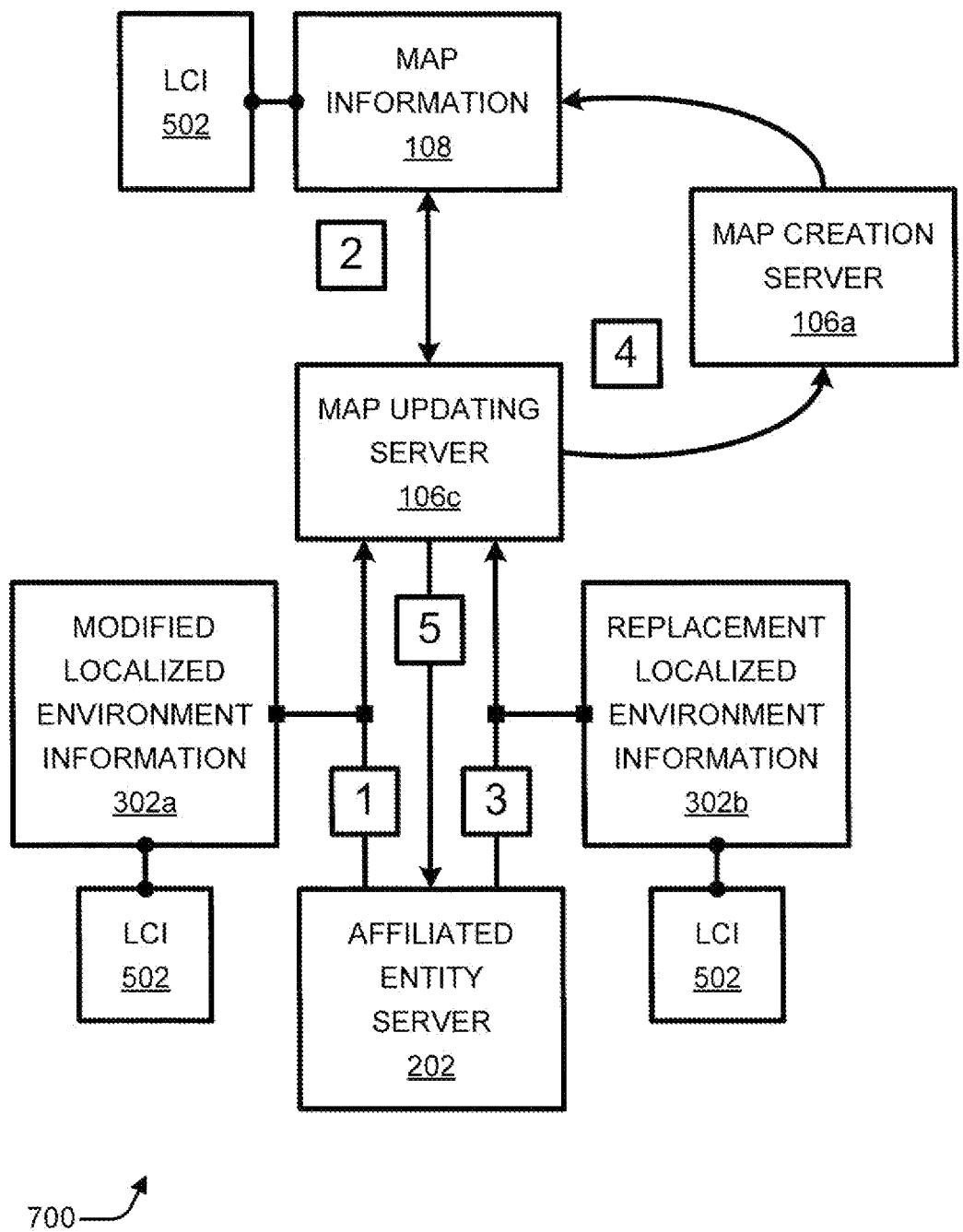
FIG. 7 is a schematic diagram of an example usage scenario for map information between an affiliated entity server and a map updating server according to an implementation.

Update information may comprise localized environment information 302 that has been changed, and changed localized environment information may comprise modified localized environment information 302a (e.g., of FIG. 7) and/or replacement localized environment information 302b (e.g., of FIG. 7). Such localized environment information 302 that has been changed may be received from an affiliated entity server 202. Example implementations with regard to affiliated entity servers 202 and changed localized environment information are described herein below with particular reference to FIGS. 7-9. Alternatively, update information may comprise data representative of at least one incident that apparently conflicts with map information 108. Such conflicting incident data may be received from one or more mobile devices 102. Example implementations with regard to mobile devices 102 and conflicting incident data are described herein below with particular reference to FIGS. 10-12.

At operation 606, the map information corresponding to the particular localized environment may be updated based at least partly on the update information so as to produce updated map information. For example, map information 108 corresponding to the particular localized environment 104 may be updated by a map updating server 106c and/or by a map creation server 106a based at least partly on the received update information so as to produce updated map information 108.

At operation 608, the updated map information may be provided to one or more mobile devices that are located at the particular localized environment. For example, the updated map information 108 may be provided wirelessly from a map dissemination server 106b to one or more mobile devices 102 that are located at (e.g., within, proximate to, within range of wireless access devices associated with, etc.) the particular localized environment 104. Updated map information may be provided to a given mobile device if map information is updated (e.g., pushed to mobile devices currently navigating at a particular localized environment), if a given mobile device next requests map information for a particular localized environment, if a given mobile device submitted a conflicting incident report that precipitated a map information updating event, some combination thereof, and so forth, just to provide a few examples.

FIG. 7 is a schematic diagram of an example usage scenario 700 for map information between an affiliated entity server and a map updating server according to an implementation. As illustrated, usage scenario 700 may include an affiliated entity server 202, a map creation server 106a, and a map updating server 106c. Usage scenario 700 may further include map information 108, at least one location context identifier 502, modified localized environment information 302a, and replacement localized environment information 302b. Usage scenario 700 may further include multiple phases, such as phases [1]-[5]. As shown, phases [2] and [4] may be performed at least primarily by map updating server 106c and/or map creation server 106a. Phases [1], [3], and [5] may relate to communication(s) between affiliated entity server 202 and map updating server 106c. Phases [1]-[5] may be performed in different orders, and/or one or more phases may be omitted from a given implementation.

For certain example implementations, usage scenario 700 may relate to localized environment information 302 that has been changed. Examples of changed localized environment information include, but are not limited to, modified localized environment information 302a, replacement localized environment information 302b, a combination thereof, and so forth. At phase [1], affiliated entity server 202 may transmit modified localized environment information 302a to map updating server 106c. Accordingly, map updating server 106c may receive modified localized environment information 302a from affiliated entity server 202. Modified localized environment information 302a may be communicated in association with location context identifier 502. Modified localized environment information 302a may include at least a portion of localized environment information 302 that has been modified as compared to a previous version of localized environment information 302. For example, an affiliated entity server may send at least a portion of a map and/or a portion of associated map annotation information. Modified portion(s) may be indicated as being for addition to a previous version of localized environment information 302 and/or as being for substitution of one or more portions of a previous version of localized environment information 302.

At phase [2], upon receiving modified localized environment information 302a, map updating server 106c may update map information 108 to produce updated map information. For example, map information 108 corresponding to a particular localized environment may be modified based at least partly on modified localized environment information 302a so as to produce updated map information 108. For instance, modified localized environment information 302a may be added to map information 108 that corresponds to the particular localized environment so as to produce the updated map information. Alternatively, modified localized environment information 302a may be substituted for at least a portion of map information 108 that corresponds to the particular localized environment so as to produce the updated map information.

For certain example implementations, at phase [3], affiliated entity server 202 may transmit replacement localized environment information 302b to map updating server 106c. Accordingly, map updating server 106c may receive replacement localized environment information 302b from affiliated entity server 202. Replacement localized environment information 302b may be communicated in association with location context identifier 502. Replacement localized environment information 302b may include up to a full set of localized environment information 302 that may be used to create a new set of map information 108. For example, an affiliated entity server may send a complete new map and/or a complete set of associated map annotation information.

At phase [4], upon receiving replacement localized environment information 302b, map updating server 106c may update map information 108 to produce updated map information. For example, map information 108 corresponding to a particular localized environment may be recreated based at least partly on replacement localized environment information 302b so as to produce updated map information 108. Map updating server 106c may include recreation logic/functionality to enable recreation of map information 108 from replacement localized environment information 302b. Alternatively, map updating server 106c may coordinate and/or cooperate with map creation server 106a to recreate map information 108 from replacement localized environment information 302b.

For example implementations of phases [1] and [3], affiliated entity server 202 may push changed (e.g., updated) localized environment information 302 when changes are made thereto. Alternatively, map updating server 106c may pull localized environment information 302 that has been changed by polling affiliated entity server 202. At phase [5], map updating server 106c may contact an affiliated entity device, such as at least one affiliated entity server 202, to determine if localized environment information has changed. If localized environment information is determined to have changed, map updating server 106c may perform an updating operation by updating map information 108 based at least partly on the changed localized environment information (e.g., modified localized environment information 302a and/or replacement localized environment information 302b).

A determination as to if localized environment information has changed may be performed using any of many possible approaches. For example, map updating server 106c may ask if localized environment information has changed, and affiliated entity server 202 may provide an answer in the affirmative or negative. Alternatively, a version number and/or date of most-recently-received localized environment information 302 may be compared by map updating server 106c to a current version number and/or date of localized environment information 302 that is currently possessed by affiliated entity server 202. As still another alternative, each set of localized environment information may be associated with a data constituency indicator, such as a checksum or hash code, that is derivable from a given version of localized environment information. Map updating server 106c may produce such a data constituency indicator for a previous version of localized environment information 302 and a current version of localized environment information 302 to determine whether localized environment information 302 has changed between the previous and current versions.

Figure 8:
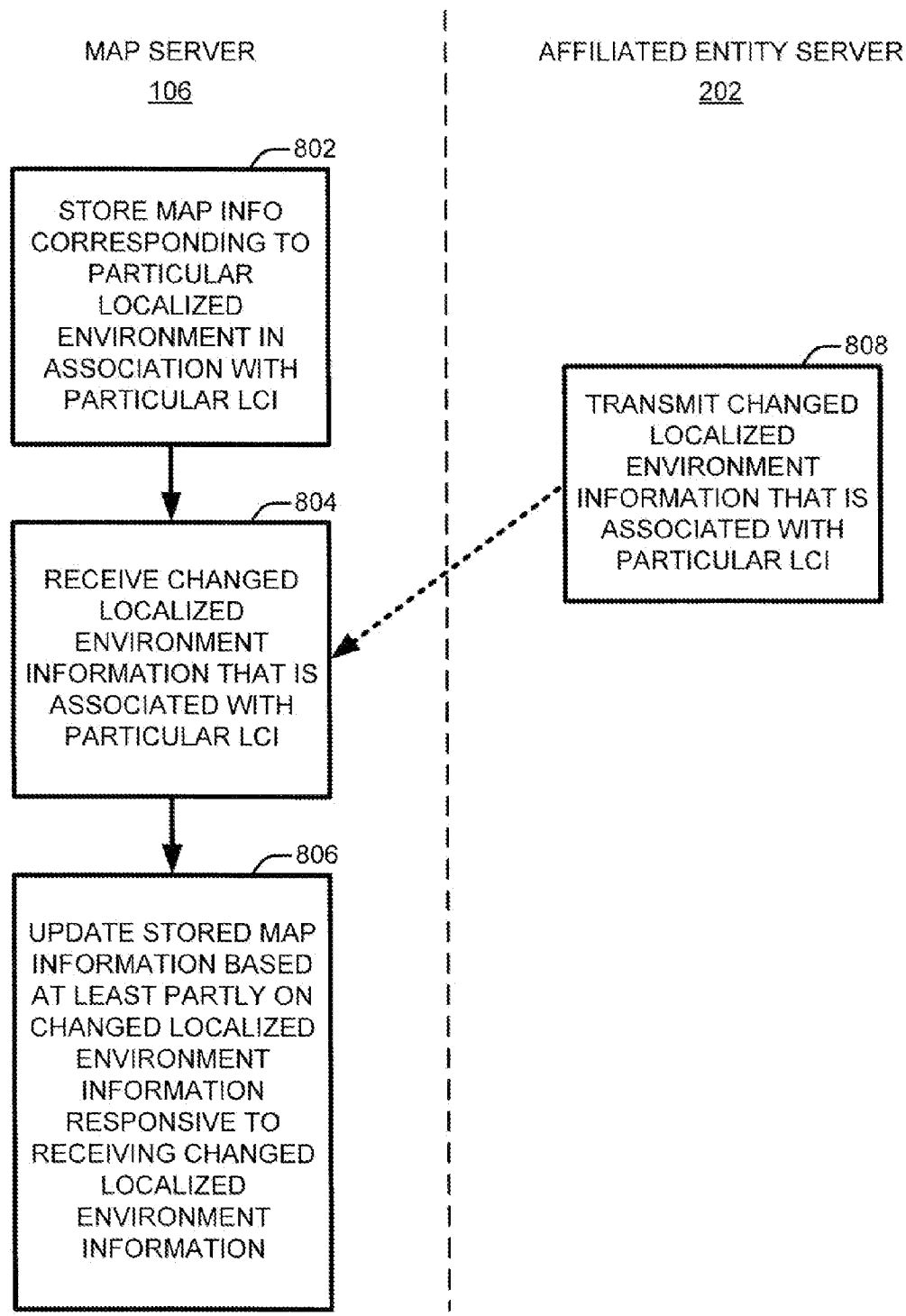
FIG. 8 is a flow diagram illustrating an example method for an interaction between an affiliated entity server and a map server to update map information according to an implementation.

FIG. 8 is a flow diagram 800 illustrating an example method for an interaction between an affiliated entity server and a map server to update map information according to an implementation. As illustrated, flow diagram 800 may include four operational blocks 802-808. Although operations 802-808 are shown and described in a particular order, it should be understood that methods may be performed in alternative manners (including with a different order and/or number of operations) without departing from claimed subject matter. Also, at least some operations of flow diagram 800 may be performed so as to be fully or partially overlapping with other operation(s). Additionally, although the description below references particular aspects and features illustrated in certain other figures (e.g., FIGS. 1-3 and 5-7), methods may be performed with other aspects and/or features.

For certain example implementations, operations 802-806 may be performed at least partially by a map server 106 (e.g., a map creation server 106a, a map dissemination server 106b, and/or a map updating server 106c). Also, operation 808 may be performed at least partially by an affiliated entity server 202. At operation 802, map information corresponding to a particular localized environment may be stored in association with a particular location context identifier. For example, a map creation server 106a, a map dissemination server 106b, and/or a map updating server 106c may store map information 108 corresponding to a particular localized environment 104 in association with a particular location context identifier 502 (e.g., in one or more mapping data structures 504).

At operation 808, changed localized environment information that is associated with a particular location context identifier may be transmitted. For example, an affiliated entity server 202 may transmit to a map updating server 106c localized environment information 302 that has been changed (e.g., modified localized environment information 302a and/or replacement localized environment information 302b) that is associated with a particular location context identifier 502.

At operation 804, changed localized environment information that is associated with a particular location context identifier may be received. For example, map updating server 106c may receive changed localized environment information from affiliated entity server 202. At operation 806, stored map information may be updated based at least partly on changed localized environment information and responsive to receiving the changed localized environment information. For example, at least map updating server 106c may update map information 108 that has been previously stored based at least partly on the received changed localized environment information. Such an updating operation may be a modification operation and/or a replacement operation with regard to stored map information 108, as is described further herein below with particular reference to FIG. 9. A modification operation may include modifying existing map information by way of addition and/or substitution to map information 108, as is described further herein above with particular reference to FIG. 7.

Figure 9:
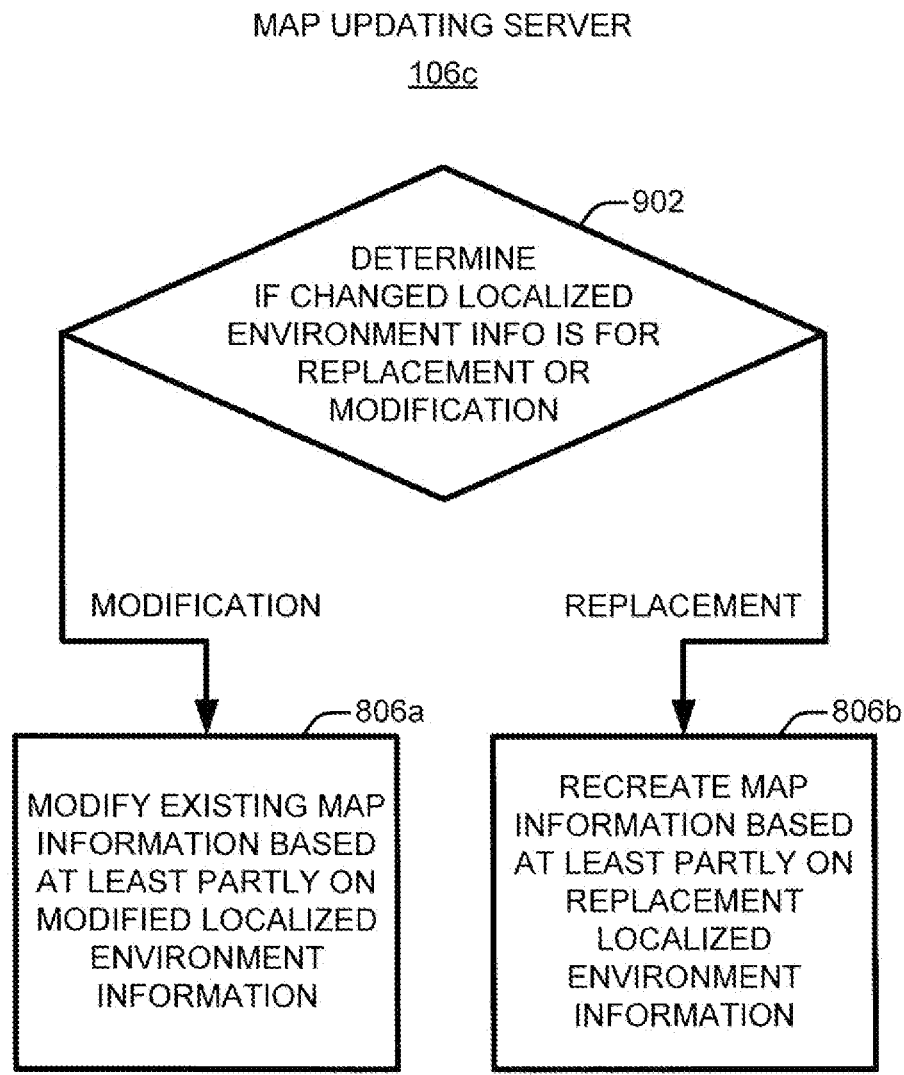
FIG. 9 is a flow diagram illustrating an example method for a map updating server to differentiate between and perform a map modification operation or a map replacement operation according to an implementation.

FIG. 9 is a flow diagram 900 illustrating an example method for a map updating server to differentiate between and perform a map modification operation or a map replacement operation according to an implementation. As illustrated, flow diagram 900 may include three operational blocks 902, 806a, and 806b. Although the operations of flow diagram 900 are shown and described in a particular manner, it should be understood that methods may be performed in alternative manners (including with a different order and/or number of operations) without departing from claimed subject matter. For certain example implementations, the operations of flow diagram 900 may be performed at least partially by a map updating server 106c.

At operation 902, it may be determined whether changed localized environment information is for replacement or modification. By way of example only, such a determination may be based on an explicit indication from an affiliated entity server 202. Alternatively, such a determination may be based on a comparison between previous localized environment information 302 and current localized environment information 302. For example, map updating server 106c may perform one or more comparisons between different portions and/or layers of different versions of localized environment information 302. For instance, map portions may be compared, annotation information may be compared, and so forth, just to name a couple of examples. If a significant percentage of annotation information has changed, it may be determined that an updating operation is for replacement, while a modification operation may be implemented if less annotation information has changed. Additionally, if map information, such as location(s) of one or more walls or other building obstacles has changed, it may be determined that an updating operation is for replacement, especially if pedestrian traffic patterns are likely to be affected. Determining whether an update operation is for replacement or modification may be performed in alternative manners without departing from claimed subject matter.

At operation 806a, if it is determined (at operation 902) that changed localized environment information is for a modification operation, then existing map information may be modified based at least partly on modified localized environment information. Such modification may be implemented by adding modified localized environment information to map information corresponding to a particular localized environment so as to produce updated map information and/or by substituting modified localized environment information for at least a portion of map information corresponding to a particular localized environment so as to produce updated map information. On the other hand, if it is determined (at operation 902) that changed localized environment information is for a replacement operation, then at operation 806b map information may be recreated based at least partly on replacement localized environment information.

Figure 10:
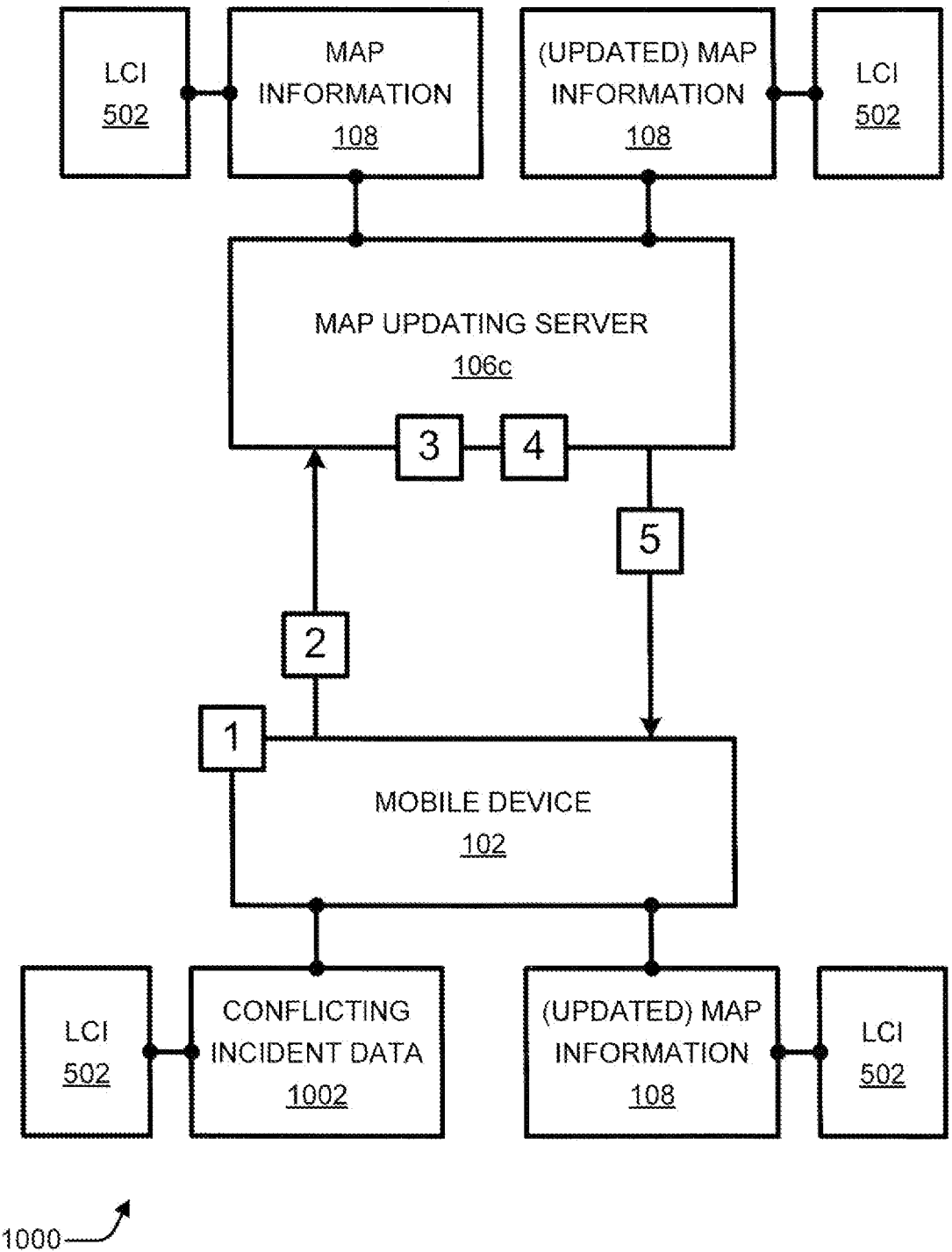
FIG. 10 is a schematic diagram of an example usage scenario for map information between a mobile device and a map updating server according to an implementation.

FIG. 10 is a schematic diagram of an example usage scenario 1000 for map information between a mobile device and a map updating server according to an implementation. As illustrated, usage scenario 1000 may include a mobile device 102 and a map updating server 106c. Usage scenario 1000 may further include map information 108, as well as updated map information 108, at least one location context identifier 502, and conflicting incident data 1002. Usage scenario 1000 may further include multiple phases, such as phases [1]-[5]. As shown, phase [1] may be performed at least primarily by mobile device 102. Phases [3] and [4] may be performed at least primarily by map updating server 106c. Phases [2] and [5] may relate to communication(s) between mobile device 102 and map updating server 106c. Phases [1]-[5] may be performed in different orders, and/or one or more phases may be omitted from a given implementation.

For certain example implementations, at phase [1], at least one incident that apparently conflicts with map information 108 may be detected by mobile device 102. Map information 108 may correspond to a particular localized environment 104 (e.g., of FIG. 1) at which mobile device 102 is located. Examples of incidents that apparently conflict with map information are described herein below with particular reference to FIG. 12. At phase [2], data representative of the at least one incident that apparently conflicts with map information 108 may be transmitted from mobile device 102. Such conflicting incident data 1002 may be associated with at least one particular location context identifier 502, which may also be transmitted from mobile device 102.

Accordingly, also at phase [2], a map server 106 (e.g., of FIG. 2), such as map updating server 106c, may receive the data representative of the at least one incident that apparently conflicts with map information 108 from mobile device 102, with mobile device 102 being located at the particular localized environment 104 corresponding to map information 108. Conflicting incident data 1002 may be received in association with the particular location context identifier 502. Map information 108 may also be associated with the particular location context identifier 502.

At phase [3], map updating server 106c may analyze the data representative of the at least one incident that apparently conflicts with map information 108 to determine whether the at least one incident does conflict with map information 108 that corresponds to the particular localized environment 104. At phase [4], map updating server 106c may update map information 108 corresponding to the particular localized environment 104 based at least partly on the data representative of the at least one incident and responsive to the analysis to produce updated map information 108.

At phase [5], map updating server 106c may transmit updated map information 108 to mobile device 102. Accordingly, mobile device 102 may receive updated map information 108 that reflects the data representative of the at least one incident that apparently conflicts with the previous map information. The updated map information 108 may correspond to the particular localized environment 104 at which mobile device 102 is located. To identify the updated map information 108, it may be transmitted and/or received in association with the at least one particular location context identifier 502.

Figure 11A:
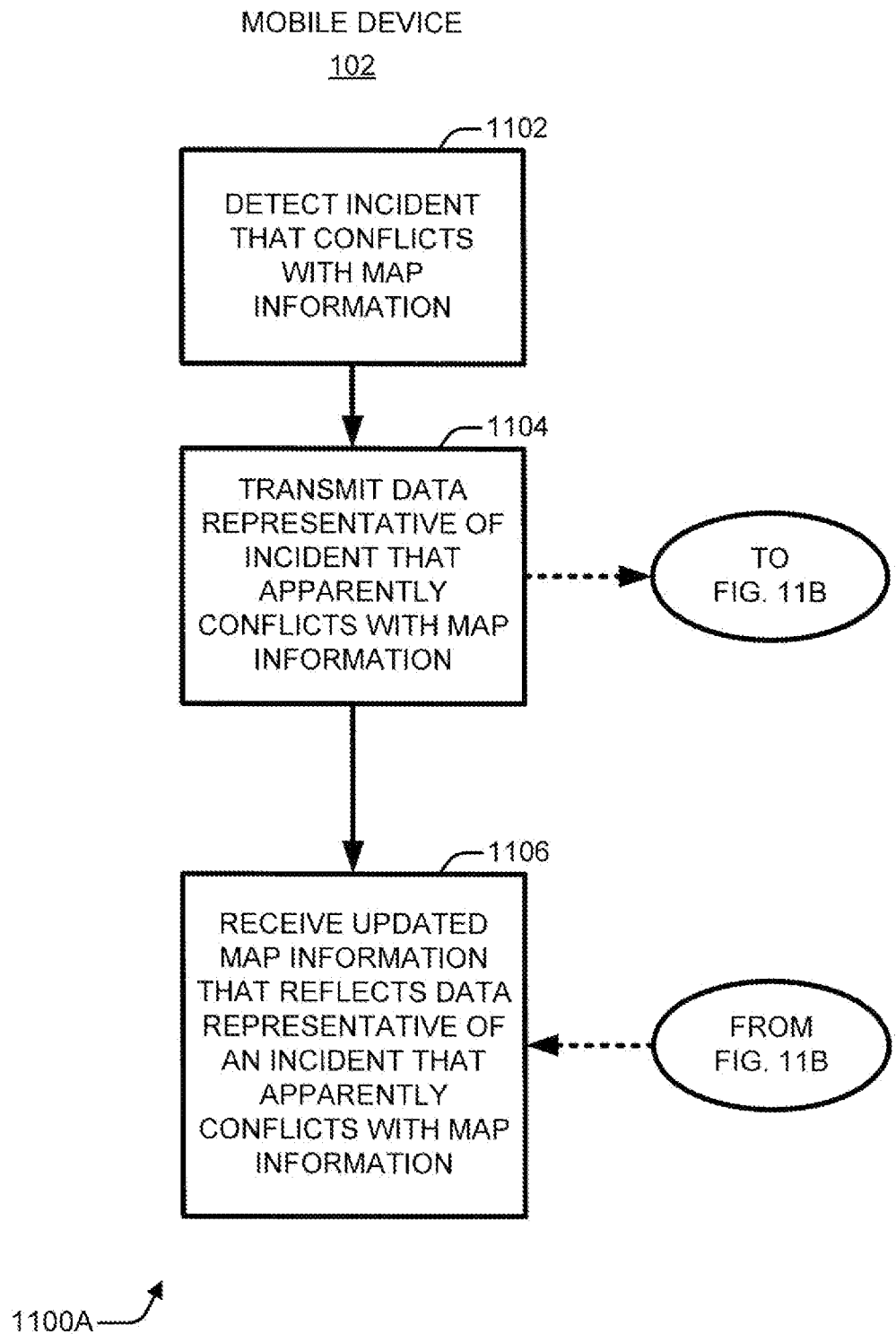
FIGS. 11A and 11B are flow diagrams illustrating example methods for interactions between a mobile device and a map updating server, respectively, to update map information according to an implementation.
Figure 11B:
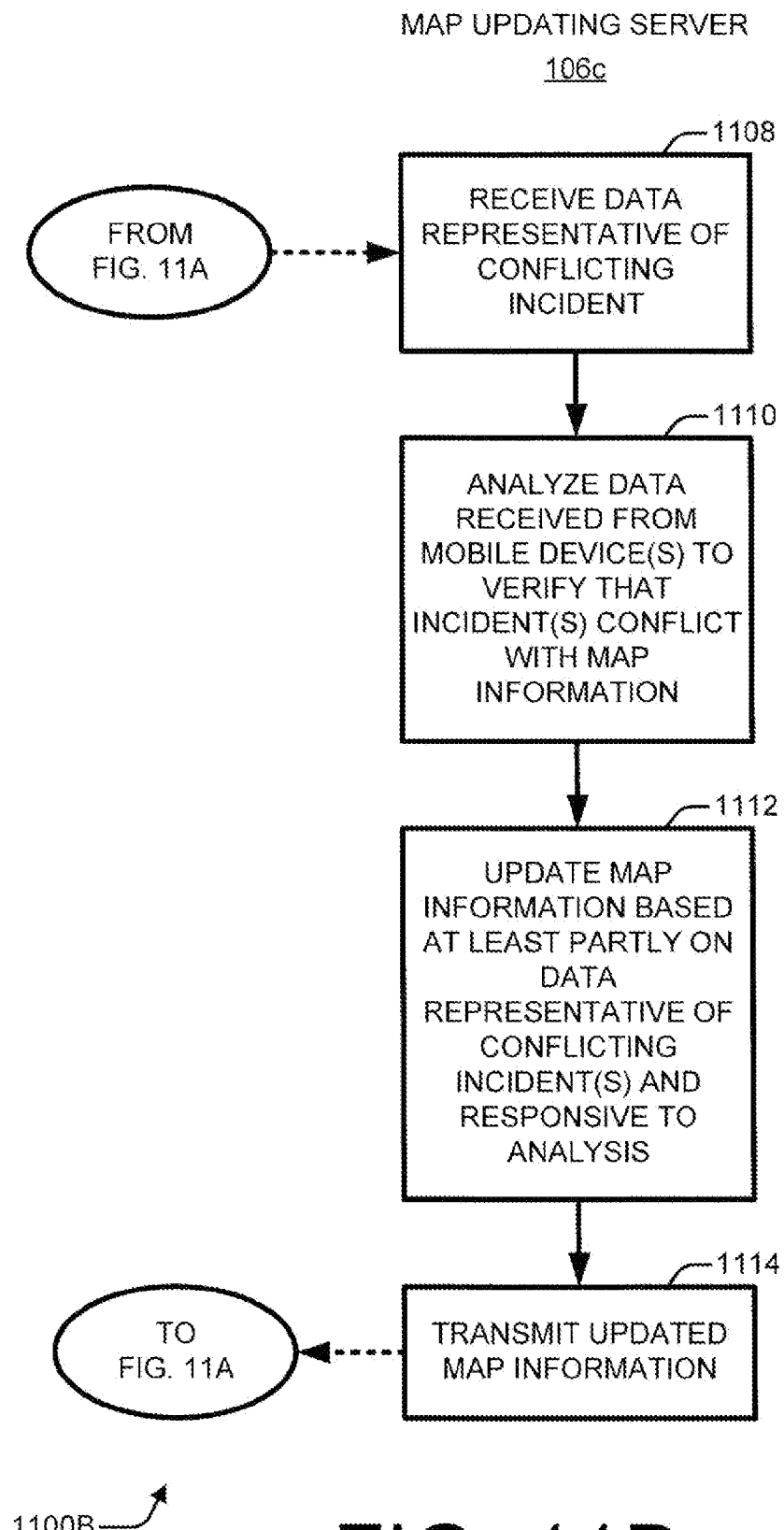

FIGS. 11A and 11B are flow diagrams 1100 illustrating example methods for interactions between a mobile device and a map updating server, respectively, to update map information according to an implementation. As illustrated, flow diagrams 1100A and 1100B may together include seven operational blocks 1102-1114. Although operations 1102-1114 are shown and described in a particular order, it should be understood that methods may be performed in alternative manners (including with a different order and/or number of operations) without departing from claimed subject matter. Also, at least some operations of flow diagrams 1100A and/or 1100B may be performed so as to be fully or partially overlapping with other operation(s). Additionally, although the description below references particular aspects and features illustrated in certain other figures (e.g., FIGS. 1-3, 5, 6, and 10), methods may be performed with other aspects and/or features.

For certain example implementations, operations 1102-1106 of flow diagram 1100A (of FIG. 11A) may be performed at least partially by a mobile device 102. Also, operations 1108-1114 of flow diagram 1100B (of FIG. 11B) may be performed at least partially by map server 106 (e.g., a map creation server 106a, a map dissemination server 106b, and/or a map updating server 106c). At operation 1102, at least one incident that apparently conflicts with map information may be detected by a mobile device, with the map information corresponding to a particular localized environment at which the mobile device is located. Examples of such incidents (e.g., incidents 1202) are described herein below with particular reference to FIG. 12.

At operation 1104, the data representative of the at least one incident that apparently conflicts with the map information may be transmitted from the mobile device to a map updating server. For example, conflicting incident data 1002 may be transmitted from mobile device 102 to map updating server 106c. At operation 1108, the data representative of the at least one incident that apparently conflicts with the map information, which is associated with a particular location context identifier, may be received from the mobile device at the map updating server, with the mobile device located at the corresponding particular localized environment.

At operation 1110, the data representative of the at least one incident that apparently conflicts with the map information may be analyzed by the map updating server to determine whether the at least one incident does conflict with the map information corresponding to the particular localized environment. At operation 1112, the map information corresponding to the particular localized environment may be updated by the map updating server based at least partly on the data representative of the at least one incident that is determined to conflict with the map information responsive to the analysis.

At operation 1114, the map updating server may transmit the updated map information to one or more mobile devices, including the mobile device that transmitted the data representative of the at least one incident that apparently conflicted with the (previous) map information. At operation 1106, the mobile device may receive the updated map information that reflects the data representative of the at least one incident that apparently conflicted with the (previous) map information, the updated map information corresponding to the particular localized environment at which the mobile device is located.

Figure 12:
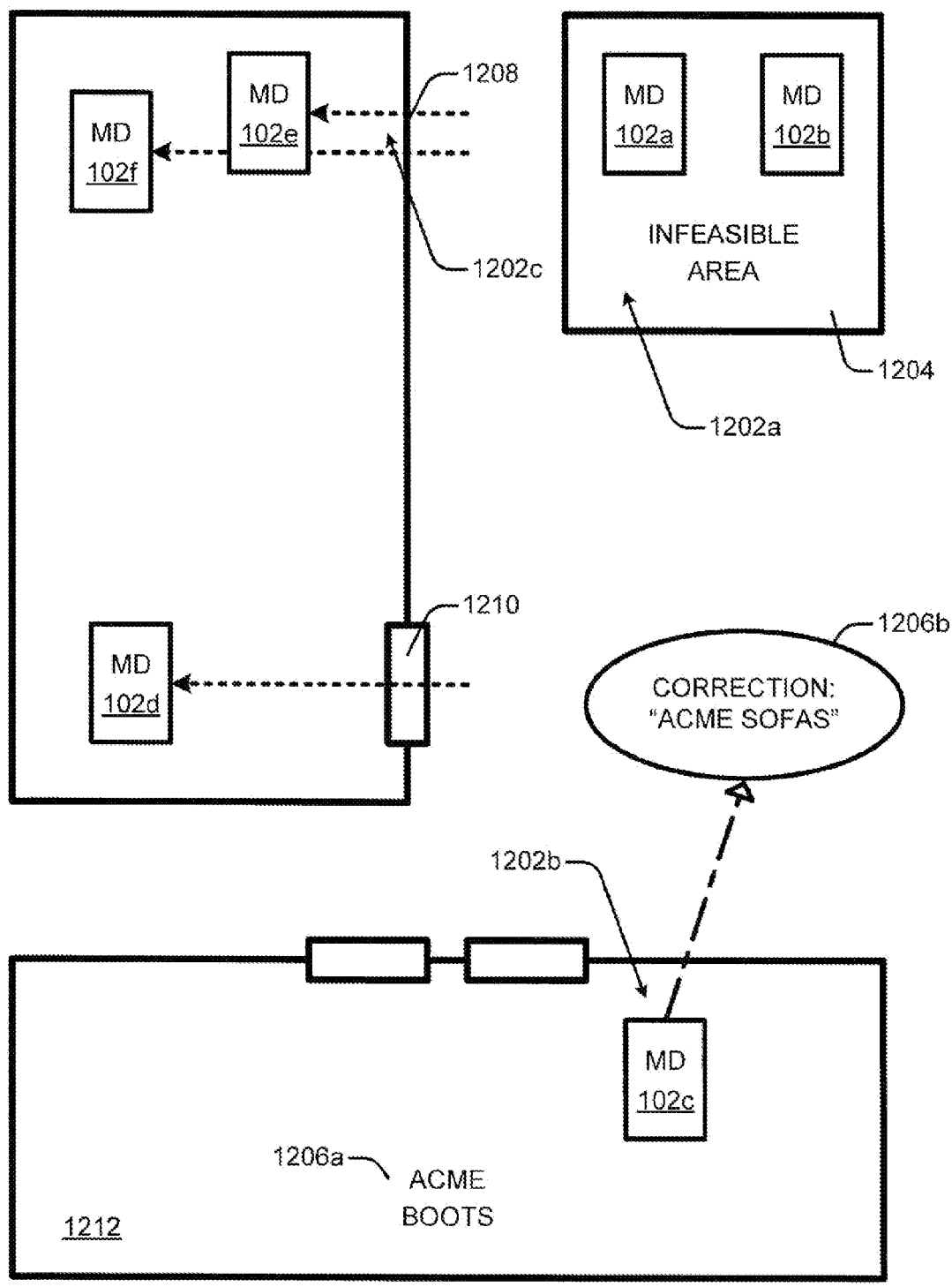
FIG. 12 is a schematic diagram of at least a portion of a localized environment in which mobile devices may experience examples of incidents that apparently conflict with map information, which incidents may precipitate and/or inform a map updating operation.

FIG. 12 is a schematic diagram 1200 of at least a portion of a localized environment in which mobile devices may experience examples of incidents that apparently conflict with map information, which incidents may precipitate and/or inform a map updating operation. As illustrated, schematic diagram 1200 may include three incidents 1202 (e.g., a first incident 1202a, a second incident 1202b, and a third incident 1202c). Schematic diagram 1200 may further include multiple mobile devices (MD) 102a-102f, an infeasible area 1204, annotation information 1206 (e.g., point of interest information), an apparent obstacle 1208, a passageway 1210, and a zone 1212. Each example incident 1202 is described below. However, claimed subject matter is not limited to these three example incidents 1202 (e.g., a first incident 1202a, a second incident 1202b, and a third incident 1202c).

For certain example implementations, first incident 1202a may involve an infeasible area 1204 and one or more mobile devices 102, such as mobile devices 102a and 102b. As shown, mobile device 102a and mobile device 102b are positioned within a zone that is identified in map information (e.g., map information 108) as being infeasible, as indicated by infeasible area 1204. This may perhaps occur, for instance, when an area that was previously reserved for a food purveyor in a food court is removed to make room for additional seating space. Mobile device 102a and/or mobile device 102b may detect such a discrepancy of an infeasible label applied to a zone in which they are currently located. More specifically, a mobile device may detect that it is positioned within a zone that is labeled as an infeasible area 1204 by map information.

Thus, data representative of at least one incident that apparently conflicts with map information may comprise one or more indications that at least one mobile device is positioned within a zone that is labeled as an infeasible area by map information. A mobile device may transmit and a map server may receive such data. In response to receiving such data, a map server may update map information corresponding to the particular localized environment in which the mobile device(s) are positioned by labeling the zone as a feasible area in updated map information. Prior to initiating a relabeling operation, a map updating server may institute a predetermined threshold number of mobile devices that are to be detected as being positioned within an infeasible area 1204 and/or a predetermined period of time over which such conflicting incidents are detected.

For certain example implementations, second incident 1202b may involve an area that is associated with incorrect annotation information 1206a (e.g., incorrect point of interest information). For instance, a zone 1212 may be associated with incorrect annotation information 1206a, such as "Acme Boots". This may perhaps occur, for instance, when one store closes and is replaced by a new store. A user of a mobile device may detect an incorrectly annotated zone and report the error. More specifically, a mobile device 102c may detect that incorrect annotation information 1206a that is associated with a zone 1212 of map information is in fact incorrect. Here, such detection by a mobile device may include detecting input from a user indicating that point of interest information is incorrect.

Thus, data representative of at least one incident that apparently conflicts with map information may comprise one or more indications that point of interest information associated with a zone of the map information is incorrect. A mobile device may transmit and a map server may receive such data. In response to receiving such data, a map server may update the map information corresponding to the particular localized environment pertaining to the incorrect point of interest information by disassociating the point of interest information from the identified zone in the updated map information (e.g., by replacing incorrect point of interest information with a "none", "unknown", etc. designation).

Furthermore, a user may be empowered to submit corrected annotation information 1206b (e.g., corrected point of interest information), such as "Acme Sofas". For example, detection by a mobile device may further include detection of corrected point of interest information being entered by a user. Thus, data representative of at least one incident that apparently conflicts with map information may comprise corrected point of interest information for a zone. To facilitate a correction, a mobile device 102c may transmit corrected annotation information 1206b for zone 1212 to at least one map updating server that is capable of updating the map information based at least partly on corrected annotation information 1206b for zone 1212. A mobile device may transmit and a map server may receive such data that includes corrected point of interest information for a zone. In response to receiving such data, a map server may update map information by associating the corrected point of interest information with an identified zone in updated map information. A map updating server may institute one or more predetermined threshold numbers of mobile devices that detect (and report) incorrect point of interest information and/or that submit corrected point of interest information prior to implementing the disassociating and/or the associating operations, respectively. Furthermore, a map updating server may institute a predetermined time period over which incorrect notifications and/or corrected information is reported prior to implementing a given correction operation.

For certain example implementations, third incident 1202c may involve one or more mobile devices 102, such as mobile devices 102e and 102f, and at least one apparent obstacle 1208. Mobile devices 102d, 102e, and 102f are associated with tracked trajectories that are represented by dashed arrows. Mobile device 102d is shown by way of its trajectory to have moved through a passageway 1210, such as a doorway. Mobile device 102e and mobile device 102f, on the other hand, are shown by way of their respective trajectories as having moved through an apparent obstacle 1208. This may perhaps occur, for instance, if a store has installed a new entrance to increase foot traffic. Mobile device 102e and/or mobile device 102f may detect such a discrepancy between their tracked trajectories and traversable paths derivable from map information. More specifically, a mobile device may detect that a tracked trajectory for itself passes through an apparent obstacle 1208 that is present in map information.

Thus, data representative of at least one incident that apparently conflicts with map information may comprise a tracked trajectory for at least one mobile device that passes through an apparent obstacle present in the map information. Such a tracked trajectory may be of any length, including only so long as is required to indicate a location of an apparent obstacle. A mobile device may transmit and a map server may receive such data. In response to receiving such data, a map server may update map information corresponding to a particular localized environment by altering an apparent obstacle for the updated map information. For example, the apparent obstacle may be marked as tentative or questionable in the updated map information, the apparent obstacle may be removed from the updated map information, and so forth, just to name a couple of examples. Prior to altering an apparent obstacle for updated map information, a map updating server may institute a predetermined threshold number of conflicting tracked trajectories that are detected and/or numbers of mobile devices that submit such incident reports. Furthermore, a map updating server may institute a predetermined time period over which such incidents are reported prior to implementing a given obstacle alteration operation.

Figure 13:
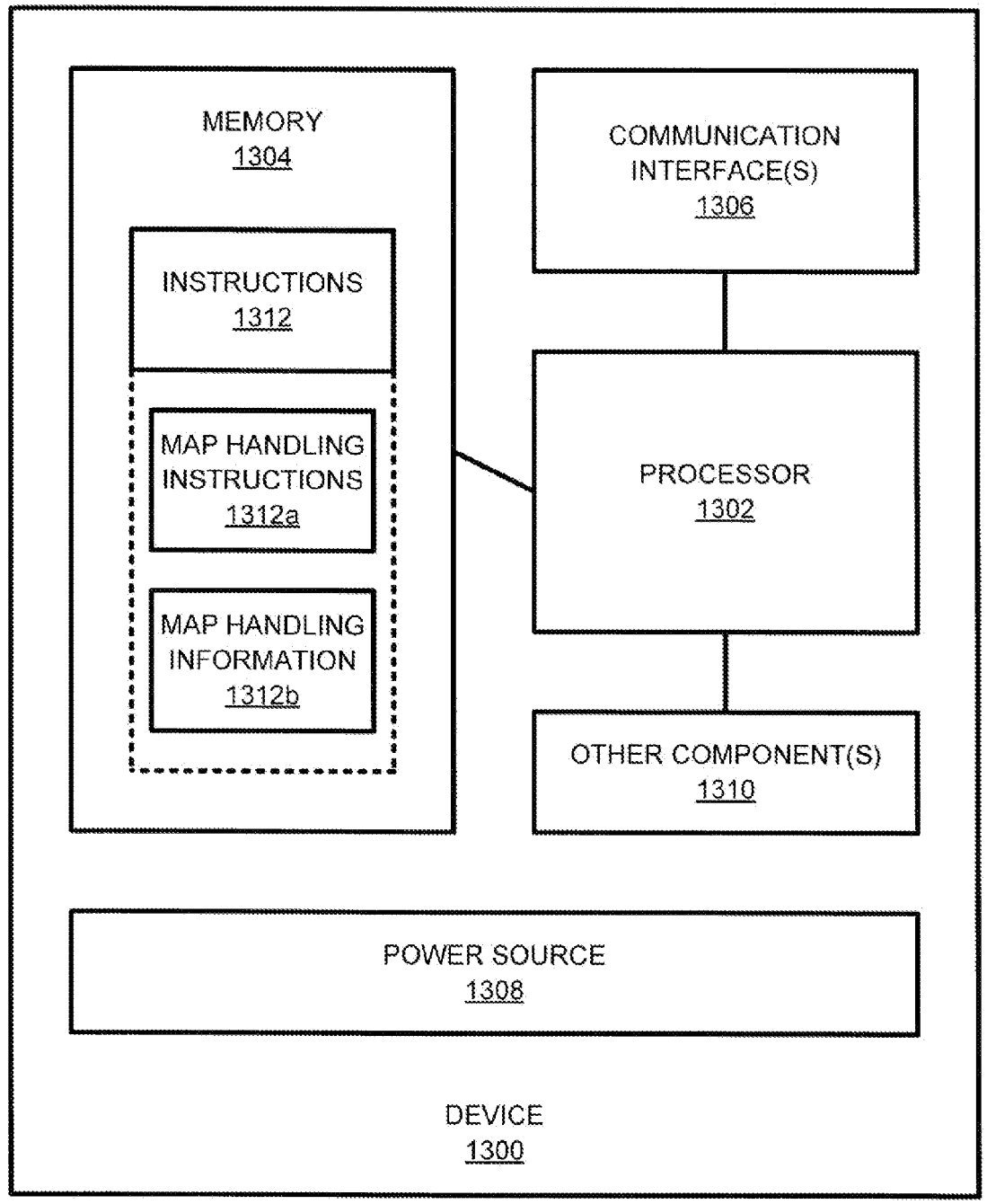
FIG. 13 is a schematic diagram illustrating an example device, according to an implementation, that may implement one or more aspects of map handling for location based services in conjunction with localized environments.

FIG. 13 is a schematic diagram illustrating an example device 1300, according to an implementation, that may implement one or more aspects of map handling for location based services in conjunction with localized environments. As illustrated, device 1300 may include at least one processor 1302, one or more memories 1304, at least one communication interface 1306, at least one power source 1308, and other component(s) 1310, such as an SPS unit (SPSU) (not explicitly shown). Memory 1304 is illustrated as including instructions 1312. However, a device 1300 may alternatively include more, fewer, and/or different components from those that are illustrated without deviating from claimed subject matter.

For certain example implementations, device 1300 may include and/or comprise at least one electronic device. Device 1300 may comprise, for example, any electronic device having at least one processor and/or memory. Examples for device 1300 include, but are not limited to, relatively fixed processing devices (e.g., a desktop computer, one or more server machines, at least one telecommunications node, an intelligent router/switch, an access point, some combination thereof, etc.), relatively mobile processing devices (e.g., a notebook computer, a personal digital assistant (PDA), a netbook, a slate or tablet computer, a portable entertainment device, a mobile phone, a smart phone, a mobile station, some combination thereof, etc.), and so forth.

Power source 1308 may provide power to components and/or circuitry of device 1300. Power source 1308 may be a portable power source, such as a battery, or a fixed power source, such as an outlet or other conduit in a car, house, or other building to a public utility power source. Power source 1308 may also be a transportable power source, such as a solar or carbon-fuel-based generator. Power source 1308 may be integrated with or separate from device 1300.

Processor 1302 may comprise any one or more processing units. Memory 1304 may store, contain, or otherwise provide access to instructions 1312 (e.g., a program, an application, etc. or portion thereof; operational data structures; processor-executable instructions; code; some combination thereof; and so forth) that may be executable by processor 1302. Execution of such instructions 1312 by one or more processors 1302 may transform device 1300 into a special-purpose computing device, apparatus, platform, some combination thereof, and so forth.

Instructions 1312 may include map handling instructions 1312a, map handling information 1312b, and so forth, just to name a couple of examples. In certain example mobile device implementations, map handling instructions 1312a may correspond to, for example, instructions that are capable of realizing: at least a portion of one or more implementations of flow diagram 1100 (of FIG. 11), such as any of operations 1102-1106; at least a portion of the phases shown in usage scenarios 500 and/or 1000 (of FIGS. 5 and 10); the reporting of at least one apparently-conflicting incident as shown in schematic diagram 1200 (of FIG. 12); any combination thereof; and so forth; just to name a few examples. Map handling information 1312b may comprise any information that facilitates, enables, or otherwise relates to map handling for location-based services in conjunction with localized environments, particularly with regard to mobile devices. Map handling information 1312b may include, but is not limited to, map information 108 that corresponds to a localized environment 104 (e.g. at which the mobile device is currently located), a location context identifier 502, conflicting incident data 1002, any combination thereof, and so forth.

In certain example map server implementations, map handling instructions 1312a may correspond to, for example, instructions that are capable of realizing: at least a portion of one or more implementations of flow diagrams 600, 800, 900, and/or 1100 (of FIGS. 6, 8, 9, and 11), such as any of operations 602-608, 802-806, 902/806a-b, and 1108-1114; at least a portion of the operational phases shown in schematic diagram 300 (of FIG. 3); at least a portion of the phases shown in usage scenarios 500, 700, and/or 1000 (of FIGS. 5, 7, and 10); the receiving and/or processing of at least one of the reportings of apparently-conflicting incidents shown in schematic diagram 1200 (of FIG. 12); any combination thereof; and so forth; just to name a few examples. Map handling information 1312b may comprise any information facilitating, enabling, or otherwise relating to map handling for location based services in conjunction with localized environments, particularly with regard to map servers (e.g., map servers 106 such as a map creation server 106a, a map dissemination server 106b, and/or a map updating server 106c). Map handling information 1312b may include, but is not limited to, map information 108 that corresponds to a localized environment 104, localized environment information 302, a map 304, a location context identifier 502, a mapping data structure 504, conflicting incident data 1002, any combination thereof, and so forth. Although not explicitly shown, instructions 1312 may also include instructions to initially create map information 108 from localized environment information 302 (e.g., in accordance with the description referencing FIG. 4).

In an example implementation, a relatively fixed processing device, such as a at least one server and/or telecommunications node, may execute map handling instructions 1312a to create and/or update map information 108 based at least partly on: localized environment information 302 (including changed localized environment information), conflicting incident data 1002, some combination thereof, and so forth. A same or a different relatively fixed processing device may disseminate map information 108 to mobile devices 102. Map information 108 may be provided to a mobile device to enable or otherwise further performance of some location-based service 112. As still another alternative, a mobile device may execute map handling instructions 1312a to provide a location-based service 112 to a user based at least partly on map handling information 1312b, which may include a routing graph and/or other map information, such as annotated points of interest. Other alternatives may instead be implemented without departing from claimed subject matter.

Communication interface(s) 1306 may provide one or more interfaces between device 1300 and other devices (e.g., and/or human operators). Hence, communication interface 1306 may include a screen, speaker, keyboard or keys, or other human-device input/output feature(s). Communication interface 1306 may include a transceiver (e.g., transmitter and/or receiver), a radio, an antenna, a wired interface connector or other such apparatus, some combination thereof, etc. to communicate wireless and/or wired signals (e.g., over wireless or wired communication links). Such communications with at least one communication interface 1306 may enable transmitting, receiving, initiating of transmissions, and so forth, just to name a few examples. Communication interface 1306 may also serve as a bus or other interconnect between and/or among other components of device 1300. Other component(s) 1310, if present, may comprise one or more other miscellaneous sensors, features, and so forth.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processor/processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions and/or designed to perform the functions described herein, and/or combinations thereof, just to name a few examples. Herein, the term "control logic" may encompass logic implemented by software, hardware, firmware, discrete/fixed logic circuitry, any combination thereof, and so forth.

For a firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software coding may be stored in a memory and executed by a processor. Memory may be implemented within the processor or external to the processor. As used herein the term "memory" refers to any type of long term, short term, volatile, nonvolatile, or other storage memory/medium and is not to be limited to any particular type of memory or number of memories, or type of media upon which memory is stored.

In one or more example implementations, the functions described may be implemented in hardware, software, firmware, discrete/fixed logic circuitry, some combination thereof, and so forth. If implemented in firmware and/or software, the functions may be stored on a physical computer-readable (e.g., via electrical digital signals) medium as one or more instructions or code (e.g., and realized as at least one article of manufacture comprising at least one storage medium having instructions stored thereon). Computer-readable media include physical computer storage media that may be encoded with a data structure, computer program, a combination thereof, and so forth. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blu-ray disc, where disks usually reproduce data magnetically, while discs usually reproduce data optically with lasers.

Also, computer instructions/code/data may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions and/or data may be transmitted in portions (e.g., first and second portions) at different times (e.g., at first and second times).

Electronic devices may also operate in conjunction with Wi-Fi/WLAN or other wireless networks. For example, positioning data may be acquired via a Wi-Fi or other wireless network. In addition to Wi-Fi/WLAN signals, a wireless/mobile device may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). Furthermore, implementations described herein may be used with positioning determination systems that utilize pseudolites or a combination of satellites and pseudolites. Pseudolites are usually ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites may be particularly useful in situations where SPS signals from an orbiting satellite might be unavailable, such as in tunnels, mines, buildings, urban canyons, or other enclosed areas.

Another implementation of pseudolites is known as radio-beacons. The term "satellite", as used herein, is also to include pseudolites, equivalents of pseudolites, and similar and/or analogous technologies. The term "SPS signals", as used herein, is also to include SPS-like signals from pseudolites or equivalents of pseudolites. Certain implementations may also be applied to femtocells or a combination of systems that includes femtocells. For example, femtocells may provide data and/or voice communication. Moreover, femtocells may provide positioning data.

In an example implementation, an SPSU (when present) may be capable of determining a location of device 1300 using an SPS system or systems. Hence, example implementations that are described herein may be used with various SPSs. An SPS typically includes a system of transmitters positioned to enable entities to determine their location on or above the Earth based, at least in part, on signals received from the transmitters. Such a transmitter typically, but not necessarily, transmits a signal marked with a repeating pseudo-random noise (PN) code of a set number of chips and may be located on ground based control stations, user equipment, and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software/instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "performing," "applying," "positioning/locating," "analyzing," "storing," "updating," "providing," "creating," "disseminating," "modifying," "recreating", "detecting" or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    storing map information corresponding to a particular localized environment that is associated with a particular location context identifier, the particular localized environment comprising an indoor environment corresponding to at least a portion of a building structure;
    receiving and accumulating update information from a plurality of remote mobile devices, wherein the update information is applicable to the map information corresponding to the particular localized environment, the update information being associated with the particular location context identifier, wherein the update information from each remote mobile device comprises a same changed localized environment information;
    updating the map information corresponding to the particular localized environment based at least partly on the update information to produce updated map information in response to the update information with the same changed localized environment information having been provided by a predetermined threshold number of remote mobile devices greater than one; and
    providing the updated map information to one or more mobile devices that are located at the particular localized environment.

2. The method of claim 1, the method further comprising:
receiving a changed localized environment information that is associated with the particular location context identifier from an affiliated entity device, the affiliated entity device associated with an entity that is affiliated with the particular localized environment; and
updating the map information corresponding to the particular localized environment based at least partly on the changed localized environment information from the affiliated entity device.

3. The method of claim 2, wherein the changed localized environment information comprises modified localized environment information; and wherein said updating the map information comprises:
modifying the map information corresponding to the particular localized environment based at least partly on the modified localized environment information to produce the updated map information.

4. The method of claim 3, wherein said modifying comprises:
adding the modified localized environment information to the map information corresponding to the particular localized environment to produce the updated map information.

5. The method of claim 3, wherein said modifying comprises:
substituting the modified localized environment information for at least a portion of the map information corresponding to the particular localized environment to produce the updated map information.

6. The method of claim 2, wherein the changed localized environment information comprises replacement localized environment information; and wherein said updating the map information comprises:
recreating map information corresponding to the particular localized environment based at least partly on the replacement localized environment information to produce the updated map information.

7. The method of claim 2, further comprising:
contacting the affiliated entity device to determine if localized environment information has changed; and
if the localized environment information is determined to have changed, performing said updating the map information by updating the map information based at least partly on the changed localized environment information to produce the updated map information.

8. The method of claim 1, wherein the update information comprises data representative of at least one incident that apparently conflicts with the map information; and wherein said receiving the update information further comprises:
receiving the data representative of the at least one incident that apparently conflicts with the map information that is associated with the particular location context identifier from the plurality of remote mobile devices, the plurality of remote mobile devices located at the particular localized environment.

9. The method of claim 8, further comprising:
analyzing the data representative of the at least one incident that apparently conflicts with the map information to determine if the at least one incident conflicts with the map information corresponding to the particular localized environment.

10. The method of claim 9, wherein said updating the map information comprises:
updating the map information corresponding to the particular localized environment based at least partly on the data representative of the at least one incident and responsive to said analyzing.

11. The method of claim 8, wherein the data representative of the at least one incident that apparently conflicts with the map information comprises one or more indications that the each remote mobile device in the plurality of remote mobile devices is positioned within a zone that is labeled as an infeasible area in the map information; and wherein said updating the map information further comprises:
updating the map information corresponding to the particular localized environment by labeling the zone as a feasible area in the updated map information.

12. The method of claim 8, wherein the data representative of the at least one incident that apparently conflicts with the map information comprises one or more indications that point of interest information associated with a zone is incorrect; and wherein said updating the map information further comprises:
updating the map information corresponding to the particular localized environment by disassociating the point of interest information from the zone in the updated map information.

13. The method of claim 12, wherein:
said receiving the data representative of the at least one incident that apparently conflicts with the map information further comprises receiving corrected point of interest information for the zone from each remote mobile device in the plurality of remote mobile devices; and
said updating the map information further comprises associating the corrected point of interest information with the zone in the updated map information responsive to said receiving of the corrected point of interest information for the zone from each remote mobile device in the plurality of remote mobile devices.

14. The method of claim 8, wherein the data representative of the at least one incident that apparently conflicts with the map information comprises a tracked trajectory for each remote mobile device in the plurality of remote mobile devices that passes through an apparent obstacle present in the map information; and wherein said updating the map information further comprises:
updating the map information corresponding to the particular localized environment by altering the apparent obstacle for the updated map information.

15. The method of claim 1, further comprising replacing the map information with the updated map information.

16. An apparatus comprising:
at least one memory to store instructions; and
one or more processors to execute said instructions and cause the apparatus to:
store map information corresponding to a particular localized environment that is associated with a particular location context identifier, the particular localized environment comprising an indoor environment corresponding to at least a portion of a building structure, wherein the update information comprises changed localized environment information;
receive and accumulate update information from a plurality of remote mobile devices, wherein the update information is applicable to the map information corresponding to the particular localized environment, the update information being associated with the particular location context identifier, wherein the update information from each remote mobile device comprises a same changed localized environment information;

update the map information corresponding to the particular localized environment based at least partly on the update information to produce updated map information in response to the update information having the same changed localized environment information having been provided by a predetermined threshold number of remote mobile devices greater than one; and provide the updated map information to one or more mobile devices that are located at the particular localized environment.

17. The apparatus of claim 16, wherein said one or more processors are further to execute said instructions to:

receive a changed localized environment information that is associated with the particular location context identifier from an affiliated entity device, the affiliated entity device associated with an entity that is affiliated with the particular localized environment; and update the map information corresponding to the particular localized environment based at least partly on the changed localized environment information from the affiliated entity device.

18. The apparatus of claim 17, wherein the changed localized environment information comprises modified localized environment information; and wherein to update the map information said one or more processors are further to execute said instructions to:

modify the map information corresponding to the particular localized environment based at least partly on the modified localized environment information to produce the updated map information.

19. The apparatus of claim 18, wherein to modify the map information said one or more processors are further to execute said instructions to:

add the modified localized environment information to the map information corresponding to the particular localized environment to produce the updated map information.

20. The apparatus of claim 18, wherein to modify the map information said one or more processors are further to execute said instructions to:

substitute the modified localized environment information for at least a portion of the map information corresponding to the particular localized environment to produce the updated map information.

21. The apparatus of claim 17, wherein the changed localized environment information comprises replacement localized environment information; and wherein to update the map information said one or more processors are further to execute said instructions to:

recreate map information corresponding to the particular localized environment based at least partly on the replacement localized environment information to produce the updated map information.

22. The apparatus of claim 17, wherein said one or more processors are further to execute said instructions and cause the apparatus to:

contact the affiliated entity device to determine if localized environment information has changed; and update the map information based at least partly on the changed localized environment information if the localized environment information is determined to have changed.

23. The apparatus of claim 16, wherein the update information comprises data representative of at least one incident that apparently conflicts with the map information; and wherein to receive the update information said one or more processors are further to execute said instructions to:

receive the data representative of the at least one incident that apparently conflicts with the map information that is associated with the particular location context identifier from the plurality of remote mobile devices, the plurality of remote mobile devices located at the particular localized environment.

24. The apparatus of claim 23 wherein said one or more processors are further to execute said instructions and cause the apparatus to:

analyze the data representative of the at least one incident that apparently conflicts with the map information to determine if the at least one incident conflicts with the map information corresponding to the particular localized environment.

25. The apparatus of claim 24, wherein to update the map information said one or more processors are further to execute said instructions to:

update the map information corresponding to the particular localized environment based at least partly on the data representative of the at least one incident and responsive to analysis of the data representative of the at least one incident that apparently conflicts with the map information.

26. The apparatus of claim 23, wherein the data representative of the at least one incident that apparently conflicts with the map information comprises one or more indications that the each remote mobile device in the plurality of remote mobile devices is positioned within a zone that is labeled as an infeasible area in the map information; and wherein to update the map information said one or more processors are further to execute said instructions to:

update the map information corresponding to the particular localized environment by labeling the zone as a feasible area in the updated map information.

27. The apparatus of claim 23, wherein the data representative of the at least one incident that apparently conflicts with the map information comprises one or more indications that point of interest information associated with a zone is incorrect; and wherein to update the map information said one or more processors are further to execute said instructions to:

update the map information corresponding to the particular localized environment by disassociating the point of interest information from the zone in the updated map information.

28. The apparatus of claim 27, wherein:

to receive the data representative of the at least one incident that apparently conflicts with the map information said one or more processors are further to execute said instructions to receive corrected point of interest information for the zone from each remote mobile device in the plurality of remote mobile devices; and to update the map information said one or more processors are further to execute said instructions to associate the corrected point of interest information with the zone in the updated map information responsive to receipt of the corrected point of interest information for the zone from each remote mobile device in the plurality of remote mobile devices.

29. The apparatus of claim 23, wherein the data representative of the at least one incident that apparently conflicts with the map information comprises a tracked trajectory for each remote mobile device in the plurality of remote mobile devices that passes through an apparent obstacle present in the map information; and wherein to update the map information said one or more processors are further to execute said instructions to:

update the map information corresponding to the particular localized environment by altering the apparent obstacle for the updated map information.

30. The apparatus of claim 16, further comprising instructions to replace the map information with the updated map information.

31. A system comprising:

means for storing map information corresponding to a particular localized environment that is associated with a particular location context identifier, the particular localized environment comprising an indoor environment corresponding to at least a portion of a building structure;

means for receiving and accumulating update information from a plurality of remote mobile devices, wherein the update information is applicable to the map information corresponding to the particular localized environment, the update information being associated with the particular location context identifier, wherein the update information from each remote mobile device comprises a same changed localized environment information;

means for updating the map information corresponding to the particular localized environment based at least partly on the update information wherein the update information comprises changed localized environment information in response to the update information with the same changed localized environment information having been provided by a predetermined threshold number of remote mobile devices greater than one; and means for providing the updated map information to one or more mobile devices that are located at the particular localized environment.

32. The system of claim 31, further comprising:

means for receiving a changed localized environment information that is associated with the particular location context identifier from an affiliated entity device, the affiliated entity device associated with an entity that is affiliated with the particular localized environment; and means for updating the map information corresponding to the particular localized environment based at least partly on the changed localized environment information from the affiliated entity device.

33. The system of claim 32, wherein the changed localized environment information comprises modified localized environment information; and wherein said means for updating the map information comprises:

means for modifying the map information corresponding to the particular localized environment based at least partly on the modified localized environment information to produce the updated map information.

34. The system of claim 33, wherein said means for modifying comprises:

means for adding the modified localized environment information to the map information corresponding to the particular localized environment to produce the updated map information.

35. The system of claim 33, wherein said means for modifying comprises:

means for substituting the modified localized environment information for at least a portion of the map information corresponding to the particular localized environment to produce the updated map information.

36. The system of claim 32, wherein the changed localized environment information comprises replacement localized environment information; and wherein said means for updating the map information comprises:

means for recreating map information corresponding to the particular localized environment based at least partly on the replacement localized environment information to produce the updated map information.

37. The system of claim 32, further comprising:

means for contacting the affiliated entity device to determine if localized environment information has changed; and means for performing map information updating based at least partly on the changed localized environment information if the localized environment information is determined to have changed.

38. The system of claim 31, wherein the update information comprises data representative of at least one incident that apparently conflicts with the map information; and wherein said means for receiving the map information comprises:

means for receiving the data representative of the at least one incident that apparently conflicts with the map information that is associated with the particular location context identifier from the plurality of remote mobile devices, the plurality of remote mobile devices located at the particular localized environment.

39. The system of claim 38, further comprising:

means for analyzing the data representative of the at least one incident that apparently conflicts with the map information to determine if the at least one incident conflicts with the map information corresponding to the particular localized environment.

40. The system of claim 39, wherein said means for updating the map information comprises:

means for updating the map information corresponding to the particular localized environment based at least partly on the data representative of the at least one incident and responsive to said analyzing.

41. The system of claim 38, wherein the data representative of the at least one incident that apparently conflicts with the map information comprises one or more indications that the each remote mobile device in the plurality of remote mobile devices is positioned within a zone that is labeled as an infeasible area in the map information; and wherein said means for updating the map information comprises:

means for updating the map information corresponding to the particular localized environment by labeling the zone as a feasible area in the updated map information.

42. The system of claim 38, wherein the data representative of the at least one incident that apparently conflicts with the map information comprises one or more indications that point of interest information associated with a zone is incorrect; and wherein said means for updating the map information comprises:

means for updating the map information corresponding to the particular localized environment by disassociating the point of interest information from the zone in the updated map information.

43. The system of claim 42 wherein:

said means for receiving the data representative of the at least one incident that apparently conflicts with the map information comprises means for receiving corrected point of interest information for the zone from each remote mobile device in the plurality of remote mobile devices; and said means for updating the map information further comprises means for associating the corrected point of interest information with the zone in the updated map information responsive to receipt of the corrected point of interest information for the zone from each remote mobile device in the plurality of remote mobile devices.

44. The system of claim 38, wherein the data representative of the at least one incident that apparently conflicts with the map information comprises a tracked trajectory for each remote mobile device in the plurality of remote mobile devices that passes through an apparent obstacle present in the map information; and wherein said means for updating the map information comprises:
means for updating the map information corresponding to the particular localized environment by altering the apparent obstacle for the updated map information.

45. The system of claim 31, further comprising means for replacing the map information with the updated map information.

46. An article comprising at least one storage medium having stored thereon instructions executable by one or more processors to:
store map information corresponding to a particular localized environment that is associated with a particular location context identifier, the particular localized environment comprising an indoor environment corresponding to at least a portion of a building structure, wherein the update information comprises changed localized environment information;
receive and accumulate update information from a plurality of remote mobile devices, wherein the update information is applicable to the map information corresponding to the particular localized environment, the update information being associated with the particular location context identifier, wherein the update information from each remote mobile device comprises a same changed localized environment information;
update the map information corresponding to the particular localized environment based at least partly on the update information to produce updated map information in response to the update information with the same changed localized environment information having been provided by a predetermined threshold number of remote mobile devices greater than one; and
provide the updated map information to one or more mobile devices that are located at the particular localized environment.

47. The article of claim 46, wherein said instructions stored on said at least one storage medium are further executable by the one or more processors to:
receive a changed localized environment information that is associated with the particular location context identifier from an affiliated entity device, the affiliated entity device associated with an entity that is affiliated with the particular localized environment; and
updating the map information corresponding to the particular localized environment based at least partly on the changed localized environment information from the affiliated entity device.

48. The article of claim 47, wherein the changed localized environment information comprises modified localized environment information; and wherein to update the map information said instructions stored on said at least one storage medium are further executable by the one or more processors to:
modify the map information corresponding to the particular localized environment based at least partly on the modified localized environment information to produce updated map information.

49. The article of claim 48, wherein to modify the map information said instructions stored on said at least one storage medium are further executable by the one or more processors to:
add the modified localized environment information to the map information corresponding to the particular localized environment to produce updated map information.

50. The article of claim 48, wherein to modify the map information said instructions stored on said at least one storage medium are further executable by the one or more processors to:
substitute the modified localized environment information for at least a portion of the map information corresponding to the particular localized environment to produce updated map information.

51. The article of claim 47, wherein the changed localized environment information comprises replacement localized environment information; and wherein to update the map information said instructions stored on said at least one storage medium are further executable by the one or more processors to:
recreate map information corresponding to the particular localized environment based at least partly on the replacement localized environment information to produce updated map information.

52. The article of claim 47, wherein said instructions stored on said at least one storage medium are further executable by the one or more processors to:
contact the affiliated entity device to determine if localized environment information has changed; and
if the localized environment information is determined to have changed, update the map information based at least partly on the changed localized environment information.

53. The article of claim 46, wherein the update information comprises data representative of at least one incident that apparently conflicts with the map information; and wherein to receive the update information said instructions stored on said at least one storage medium are further executable by the one or more processors to:
receive the data representative of the at least one incident that apparently conflicts with the map information that is associated with the particular location context identifier from the plurality of remote mobile devices, the plurality of remote mobile devices located at the particular localized environment.

54. The article of claim 53, wherein said instructions stored on said at least one storage medium are further executable by the one or more processors to:
analyze the data representative of the at least one incident that apparently conflicts with the map information to determine if the at least one incident conflicts with the map information corresponding to the particular localized environment.

55. The article of claim 54, wherein to update the map information said instructions stored on said at least one storage medium are further executable by the one or more processors to:
update the map information corresponding to the particular localized environment based at least partly on the data representative of the at least one incident and responsive to analysis of the data representative of the at least one incident that apparently conflicts with the map information.

56. The article of claim 53, wherein the data representative of the at least one incident that apparently conflicts with the map information comprises one or more indications that the each remote mobile device in the plurality of remote mobile devices is positioned within a zone that is labeled as an infeasible area in the map information; and wherein to update the map information said instructions stored on said at least one storage medium are further executable by the one or more processors to:

update the map information corresponding to the particular localized environment by labeling the zone as a feasible area in the updated map information.

57. The article of claim 53, wherein the data representative of the at least one incident that apparently conflicts with the map information comprises one or more indications that point of interest information associated with a zone is incorrect; and wherein to update the map information said instructions stored on said at least one storage medium are further executable by the one or more processors to:

update the map information corresponding to the particular localized environment by disassociating the point of interest information from the zone in the updated map information.

58. The article of claim 57, wherein:

to receive the data representative of the at least one incident that apparently conflicts with the map information said instructions stored on said at least one storage medium are further executable by the one or more processors to receive corrected point of interest information for the zone from each remote mobile device in the plurality of remote mobile devices; and to update the map information said instructions stored on said at least one storage medium are further executable by the one or more processors to associate the corrected point of interest information with the zone in the updated map information responsive to receipt of the corrected point of interest information for the zone from each remote mobile device in the plurality of remote mobile devices.

59. The article of claim 53, wherein the data representative of the at least one incident that apparently conflicts with the map information comprises a tracked trajectory for each remote mobile device in the plurality of remote mobile devices that passes through an apparent obstacle present in the map information; and wherein to update the map information said instructions stored on said at least one storage medium are further executable by the one or more processors to:

update the map information corresponding to the particular localized environment by altering the apparent obstacle for the updated map information.

60. The article of claim 46, further comprising instructions to replace the map information with the updated map information.

* * * * *